(12) United States Patent
Ljungblad

(10) Patent No.: US 9,505,172 B2
(45) Date of Patent: Nov. 29, 2016

(54) METHOD AND APPARATUS FOR ADDITIVE MANUFACTURING

(71) Applicant: Arcam AB, Moelndal (SE)

(72) Inventor: Ulric Ljungblad, Moelndal (SE)

(73) Assignee: Arcam AB, Moelndal (SE)

( * ) Notice: Subject to any disclaimer, the term of this patent is extended or adjusted under 35 U.S.C. 154(b) by 0 days.

(21) Appl. No.: 14/443,016

(22) PCT Filed: Nov. 19, 2013

(86) PCT No.: PCT/EP2013/074181
§ 371 (c)(1),
(2) Date: May 14, 2015

(87) PCT Pub. No.: WO2014/095208
PCT Pub. Date: Jun. 26, 2014

(65) Prior Publication Data
US 2015/0306819 A1  Oct. 29, 2015

Related U.S. Application Data

(60) Provisional application No. 61/738,201, filed on Dec. 17, 2012.

(51) Int. Cl.
*B22F 3/00* (2006.01)
*B29C 67/00* (2006.01)
(Continued)

(52) U.S. Cl.
CPC ......... *B29C 67/0077* (2013.01); *B22F 3/1055* (2013.01); *B28B 1/001* (2013.01);
(Continued)

(58) Field of Classification Search
CPC ........... B29C 67/0077; B29C 67/0085; B22F 3/1055; B28B 1/001
See application file for complete search history.

(56) References Cited

U.S. PATENT DOCUMENTS 2,264,968 A  12/1941  De Forest
2,323,715 A  7/1943  Kuehni
(Continued)

FOREIGN PATENT DOCUMENTS

CA  2860188 A1  6/2006
CN  101635210 A  1/2010
(Continued)

OTHER PUBLICATIONS

International Searching Authority, International Search Report for International Application No. PCT/EP2013/074181, Feb. 21, 2014, 4 pages, European Patent Office, The Netherlands.
(Continued)

*Primary Examiner* — Joseph S. Del Sole
*Assistant Examiner* — John Robitaille
(74) *Attorney, Agent, or Firm* — Alston & Bird LLP

(57) ABSTRACT

The present invention relates to a method for forming a three-dimensional article through successive fusion of applied powder. Said method comprising the steps of: providing at least one powder hopper comprising powder to be used for forming said three-dimensional article, providing a predetermined amount of powder at a build support, directing an energy beam over said build support causing at least a portion of said powder to sinter and causing at least a portion of said powder to bond to said build support, directing an energy beam over said build support causing said powder to fuse in selected locations according to a model to form a first portion of said three-dimensional article, rotating said build support around an axis of rotation for creating said three-dimensional article, which three-dimensional article is build up layer by layer in a radial direction with respect to said axis of rotation.

42 Claims, 15 Drawing Sheets

(51) Int. Cl.
  *B22F 3/105* (2006.01)
  *B28B 1/00* (2006.01)
  *B33Y 10/00* (2015.01)
  *B33Y 30/00* (2015.01)
(52) U.S. Cl.
  CPC .... *B29C 67/0085* (2013.01); *B22F 2003/1056* (2013.01); *B33Y 10/00* (2014.12); *B33Y 30/00* (2014.12); *Y02P 10/295* (2015.11)

(56) References Cited

U.S. PATENT DOCUMENTS

| | | | |
|---|---|---|---|
| 3,882,477 A | 5/1975 | Mueller | |
| 4,323,756 A * | 4/1982 | Brown | B22F 3/006 219/121.66 |
| 4,348,576 A | 9/1982 | Anderl et al. | |
| 4,401,719 A | 8/1983 | Kobayashi et al. | |
| 4,818,562 A | 4/1989 | Arcella et al. | |
| 4,863,538 A * | 9/1989 | Deckard | B23K 26/082 156/272.8 |
| 4,927,992 A | 5/1990 | Whitlow et al. | |
| 5,167,989 A | 12/1992 | Dudek et al. | |
| 5,182,170 A | 1/1993 | Marcus et al. | |
| 5,247,560 A | 9/1993 | Hosokawa et al. | |
| 5,483,036 A | 1/1996 | Giedt et al. | |
| 5,511,103 A | 4/1996 | Hasegawa | |
| 5,647,931 A | 7/1997 | Retallick et al. | |
| 5,753,274 A | 5/1998 | Wilkening et al. | |
| 5,837,960 A | 11/1998 | Lewis et al. | |
| 5,876,550 A | 3/1999 | Feygin et al. | |
| 5,904,890 A | 5/1999 | Lohner et al. | |
| 5,932,290 A | 8/1999 | Lombardi et al. | |
| 6,046,426 A | 4/2000 | Jeantette et al. | |
| 6,162,378 A | 12/2000 | Bedal et al. | |
| 6,419,203 B1 | 7/2002 | Dang | |
| 6,554,600 B1 | 4/2003 | Hofmann et al. | |
| 6,583,379 B1 | 6/2003 | Meiners et al. | |
| 6,751,516 B1 | 6/2004 | Richardson | |
| 6,764,636 B1 | 7/2004 | Allanic et al. | |
| 6,811,744 B2 | 11/2004 | Keicher et al. | |
| 6,815,636 B2 | 11/2004 | Chung et al. | |
| 6,824,714 B1 | 11/2004 | Türck et al. | |
| 7,003,864 B2 | 2/2006 | Dirscherl | |
| 7,020,539 B1 | 3/2006 | Kovacevic et al. | |
| 7,165,498 B2 | 1/2007 | Mackrill et al. | |
| 7,204,684 B2 | 4/2007 | Ederer et al. | |
| 7,291,002 B2 | 11/2007 | Russell et al. | |
| 7,540,738 B2 | 6/2009 | Larsson et al. | |
| 7,635,825 B2 | 12/2009 | Larsson | |
| 7,686,605 B2 | 3/2010 | Perret et al. | |
| 7,696,501 B2 | 4/2010 | Jones | |
| 7,713,454 B2 | 5/2010 | Larsson | |
| 7,799,253 B2 | 9/2010 | Höchsmann et al. | |
| 7,871,551 B2 | 1/2011 | Wallgren et al. | |
| 8,021,138 B2 | 9/2011 | Green | |
| 8,083,513 B2 | 12/2011 | Montero-Escuder et al. | |
| 8,187,521 B2 | 5/2012 | Larsson et al. | |
| 8,308,466 B2 | 11/2012 | Ackelid et al. | |
| 8,992,816 B2 | 3/2015 | Jonasson et al. | |
| 9,073,265 B2 | 7/2015 | Snis | |
| 9,079,248 B2 | 7/2015 | Ackelid | |
| 9,126,167 B2 | 9/2015 | Ljungblad | |
| 9,310,188 B2 | 4/2016 | Snis | |
| 2002/0104973 A1 | 8/2002 | Kerekes | |
| 2002/0152002 A1 | 10/2002 | Lindemann et al. | |
| 2003/0133822 A1 | 7/2003 | Harryson | |
| 2004/0084814 A1 | 5/2004 | Boyd et al. | |
| 2004/0104499 A1 | 6/2004 | Keller | |
| 2004/0173496 A1 | 9/2004 | Srinivasan | |
| 2004/0173946 A1 | 9/2004 | Pfeifer et al. | |
| 2005/0186538 A1 | 8/2005 | Uckelmann | |
| 2006/0108712 A1 | 5/2006 | Mattes | |
| 2006/0145381 A1 | 7/2006 | Larsson | |
| 2006/0147332 A1 | 7/2006 | Jones et al. | |
| 2006/0157892 A1 | 7/2006 | Larsson | |
| 2006/0180957 A1 | 8/2006 | Hopkinson et al. | |
| 2006/0284088 A1 | 12/2006 | Fukunaga et al. | |
| 2007/0175875 A1 | 8/2007 | Uckelmann et al. | |
| 2007/0182289 A1 | 8/2007 | Kigawa et al. | |
| 2007/0298182 A1 | 12/2007 | Perret et al. | |
| 2008/0236738 A1 | 10/2008 | Lo et al. | |
| 2009/0017219 A1 | 1/2009 | Paasche et al. | |
| 2009/0152771 A1 | 6/2009 | Philippi et al. | |
| 2010/0310404 A1 | 12/2010 | Ackelid | |
| 2011/0133367 A1 | 6/2011 | Weidinger et al. | |
| 2011/0309554 A1 | 12/2011 | Liska et al. | |
| 2011/0316178 A1 | 12/2011 | Uckelmann | |
| 2012/0100031 A1 | 4/2012 | Ljungblad | |
| 2012/0165969 A1* | 6/2012 | Elsey | B29C 67/0085 700/120 |
| 2012/0193530 A1 | 8/2012 | Parker et al. | |
| 2012/0223059 A1 | 9/2012 | Ackelid | |
| 2012/0266815 A1 | 10/2012 | Brunermer | |
| 2013/0300286 A1 | 11/2013 | Ljungblad et al. | |
| 2014/0301884 A1 | 10/2014 | Hellestam et al. | |
| 2014/0308153 A1 | 10/2014 | Ljungblad | |
| 2014/0314609 A1 | 10/2014 | Ljungblad et al. | |
| 2014/0314964 A1 | 10/2014 | Ackelid | |
| 2014/0348691 A1 | 11/2014 | Ljungblad et al. | |
| 2014/0367367 A1 | 12/2014 | Wood et al. | |
| 2015/0004045 A1 | 1/2015 | Ljungblad | |
| 2015/0071809 A1 | 3/2015 | Nordkvist et al. | |
| 2015/0086409 A1 | 3/2015 | Hellestam | |
| 2015/0088295 A1 | 3/2015 | Hellestam | |
| 2015/0151490 A1 | 6/2015 | Jonasson et al. | |
| 2015/0165524 A1 | 6/2015 | Ljungblad et al. | |
| 2015/0165525 A1 | 6/2015 | Jonasson | |
| 2015/0174658 A1 | 6/2015 | Ljungblad | |
| 2015/0174695 A1 | 6/2015 | Elfstroem et al. | |
| 2015/0251249 A1 | 9/2015 | Fager | |
| 2015/0283610 A1 | 10/2015 | Ljungblad et al. | |
| 2015/0283613 A1 | 10/2015 | Backlund et al. | |
| 2015/0290710 A1 | 10/2015 | Ackelid | |
| 2016/0052056 A1 | 2/2016 | Fager | |
| 2016/0052079 A1 | 2/2016 | Ackelid | |
| 2016/0054115 A1 | 2/2016 | Snis | |
| 2016/0054121 A1 | 2/2016 | Snis | |
| 2016/0054347 A1 | 2/2016 | Snis | |
| 2016/0059314 A1 | 3/2016 | Ljungblad et al. | |

FOREIGN PATENT DOCUMENTS

| | | |
|---|---|---|
| CN | 201693176 U | 1/2011 |
| DE | 19952998 A1 | 5/2001 |
| DE | 20305843 U1 | 7/2003 |
| DE | 102005014483 A1 | 10/2006 |
| DE | 202008005417 U1 | 8/2008 |
| DE | 102007018601 A1 | 10/2008 |
| DE | 102008012064 A1 | 9/2009 |
| EP | 0289116 A1 | 11/1988 |
| EP | 0322257 A2 | 6/1989 |
| EP | 0688262 A1 | 12/1995 |
| EP | 1418013 A1 | 5/2004 |
| EP | 1466718 A2 | 10/2004 |
| EP | 1683593 A2 | 7/2006 |
| EP | 1721725 A1 | 11/2006 |
| EP | 1952932 A2 | 8/2008 |
| EP | 2011631 A1 | 1/2009 |
| EP | 2119530 A1 | 11/2009 |
| EP | 2281677 A1 | 2/2011 |
| JP | 2003245981 | 9/2003 |
| SE | 524467 C2 | 8/2004 |
| WO | WO 93/08928 | 5/1993 |
| WO | WO 96/12607 A1 | 5/1996 |
| WO | WO 97/37523 A2 | 10/1997 |
| WO | WO 01/81031 A1 | 11/2001 |
| WO | WO 01/85386 A2 | 11/2001 |
| WO | WO 2002/008653 A1 | 1/2002 |
| WO | WO 2004/043680 A2 | 5/2004 |
| WO | WO 2004/054743 A1 | 7/2004 |
| WO | WO 2004/056511 A1 | 7/2004 |
| WO | WO 2006/091097 A2 | 8/2006 |
| WO | WO 2006/121374 A1 | 11/2006 |
| WO | WO 2007/112808 A1 | 10/2007 |

(56) References Cited

FOREIGN PATENT DOCUMENTS

| | | |
|---|---|---|
| WO | WO 2007/147221 A1 | 12/2007 |
| WO | WO 2008/013483 A1 | 1/2008 |
| WO | WO 2008/057844 A1 | 5/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2011/008143 A1 | 1/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2014/071968 A1 | 5/2014 |
| WO | WO 2014/095200 A1 | 6/2014 |
| WO | WO 2014/095208 A1 | 6/2014 |

OTHER PUBLICATIONS

International Preliminary Examining Authority, International Preliminary Report on Patentability for International Application No. PCT/EP2013/074181, Mar. 4, 2015, 11 pages, European Patent Office, The Netherlands.

Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.

Weigel, T., et al., "Design and Preparation of Polymeric Scaffolds for Tissue Engineering," Expert Rev. Med. Devices, 2006, pp. 835-851, vol. 3, No. 6, XP002691485.

Yang, et al., "The Design of Scaffolds for Use in Tissue Engineering, Part II, Rapid Prototyping Techniques", Tissue Engineering, 2002, pp. 1-11, vol. 8, No. 1, XP002691484.

\* cited by examiner

METHOD AND APPARATUS FOR ADDITIVE MANUFACTURING

CROSS REFERENCE TO RELATED APPLICATIONS

This application is a National Stage Application, filed under 35 U.S.C. §371, of International Application No. PCT/EP2013/074181, filed Nov. 19, 2013, which claims priority to U.S. Provisional Application No. 61/738,201, filed Dec. 17, 2012, the contents of both which are hereby incorporated by reference in their entirety.

BACKGROUND

Related Field

The present invention relates to a method and apparatus for forming a three-dimensional article according to the set of claims presented herewith.

Description of Related Art

Freeform fabrication or additive manufacturing is a method for forming three-dimensional articles through successive fusion of chosen parts of powder layers applied to a worktable. A method and apparatus according to this technique is disclosed in US 2009/0152771.

Such an apparatus may comprise a work table on which said three-dimensional article is to be formed, a powder dispenser, arranged to lay down a thin layer of powder on the work table for the formation of a powder bed, a ray gun for delivering energy to the powder whereby fusion of the powder takes place, elements for control of the ray given off by the ray gun over said powder bed for the formation of a cross section of said three-dimensional article through fusion of parts of said powder bed, and a controlling computer, in which information is stored concerning consecutive cross sections of the three-dimensional article. A three-dimensional article is formed through consecutive fusions of consecutively formed cross sections of powder layers, successively laid down by the powder dispenser.

There is a need for a method and apparatus which enables manufacturing of larger 3-dimensional articles. However, with the existing technology as discussed above, larger articles require larger deflection of the energy beam, and at a certain size of the 3-dimensional article a maximum deflection may be reached. Surpassing the maximum deflection of the energy beam may affect the quality of the energy beam and capability of heating and/or fusing the powder material.

BRIEF SUMMARY

An object of the invention is to provide a method and apparatus which solve the above mentioned need in the art.

The abovementioned object is achieved by the features in the method according to claim 1 and the apparatus according to claim 26.

In a first aspect of the invention it is provided a method for forming a three-dimensional article through successive fusion of applied powder, said method comprising the steps of: providing at least one powder hopper comprising powder to be used for forming said three-dimensional article. Providing a predetermined amount of powder at a build support. Directing an energy beam over said build support causing at least a portion of said powder to sinter and causing at least a portion of said powder to bond to said build support. Directing an energy beam over said build support causing said powder to fuse in selected locations according to a model to form a first portion of said three-dimensional article. Rotating said build support around an axis of rotation for creating said three-dimensional article, which three-dimensional article is build up layer by layer in a radial direction with respect to said axis of rotation.

An advantage of this embodiment is that three-dimensional objects extending essentially in two dimensions may easily be manufactured.

Another advantage of this embodiment is that objects having an axis of rotation rotational are especially suitable to manufacture. However, the embodiment is by no means limited to manufacture objects having such a rotational axis.

In one example embodiment of the present invention said method further comprising the step of: providing said powder hopper movable in a radial direction with respect to said axis of rotation.

An advantage of this embodiment is that the amount of powder may be regulated by adjusting the distance of the powder hopper to said three-dimensional article.

In another example embodiment of the present invention a distance between an opening of said powder hopper and an outer surface of said three-dimensional article is kept at constant predetermined value for allowing a predetermined amount of powder to exit from said powder container onto said outer surface of said three-dimensional article.

Having a predefined size of the opening of said powder hopper a predetermined amount of powder may exit from said opening. This may make sure that the powder layer thickness is kept at a constant level.

In another example embodiment a distance between an opening of said powder hopper and an outer surface of said three-dimensional article may be varied for allowing a varying amount of powder to exit from said powder container onto said outer surface of said three-dimensional article. By adjusting the distance between said opening and said surface of the three dimensional object the amount of powder which is exiting from said powder hopper may be varied. Another possibility would be to use a shutter for increasing or decreasing the opening area of said opening. A variable amount of powder may be necessary as the three-dimensional article is growing. If the rotational speed is kept constant more powder is required in a second layer compared to a first layer, where said second layer is provided on top of said second layer.

In another example embodiment of the present invention the distance between said outer surface of said three-dimensional article and said opening of said powder hopper is measured and said measured distance is used for moving said powder hopper to a predetermined position.

An advantage of this example embodiment is that the distance may constantly be monitored and thereby making it possible to make small changes to the position of the powder hopper for keeping said distance within a predetermined range.

In still another example embodiment of the present invention the position of said outer surface of said three-dimensional article is calculated and using said calculated position for moving said powder hopper to a predetermined position.

Since the thickness of an applied powder layer may be known before it is applied the size, and thereby the specific position, of the three-dimensional article may be known before the three-dimensional article is actually started to be manufactured. The thickness information may be used in said calculation step in order to determine the position of the outer surface of said three-dimensional article at any predetermined position and time.

In another example embodiment of the present invention said axis of rotation of said build support in a horizontal direction.

An advantage of this embodiment is that it provides for at least a portion of said axis of rotation and later on said three-dimensional article will be essentially horizontal. The horizontal portion may be suitable for providing said powder on. The opening of said powder hopper may therefore be arranged over said essentially horizontal surface. Powder applied on said horizontal surface may not fall to other positions on said three-dimensional article before being sintered, as may be the case if the powder would have been applied on a surface which is slanted relative to the horizontal plane.

In another example embodiment of the present invention said powder is sintered using said electron beam and fused using at least said laser beam.

In still another example embodiment of the present invention said powder is sintered using said laser beam and fused using at least said electron beam.

In yet another example embodiment of the present invention said powder is sintered using a first electron beam source and fused using at least a second electron beam source.

In still another example embodiment of the present invention said powder is sintered using a first laser beam source and fused using at least a second laser beam source.

The advantage of using a first energy source for sintering and a second energy source for fusing is that they may work independently of each other. Another advantage is that the energy beam may be quite different when sintering compared to when fusing, which means that the beam property may need to be changed from a first mode when sintering to a second mode when fusing. Doing that for a single energy beam source may take time. Another advantage is that one may use a first type of energy beam source for sintering and a second type of energy beam source for fusing. The sintering does not need any particular quality of the beam more than the power inserted to the material need to be defined. This may be done by a relatively wide spot. This implies that the sintering may be performed by resistive heating or IR heating or a wide spot from a laser or electron beam source. The fusion may need a well-defined energy beam spot which requires a very different setup of the energy source as if the same source was used for sintering. The advantage of having a different energy beam source for different purposes, sintering and fusing, may save time and may increase the quality of the beam while fusing.

In another example embodiment of the present invention a refocusing the electron beam and/or the laser beam may be performed as the three dimensional article is expanding in a radial direction.

In still another example embodiment of the present invention a moving the electron beam source may be performed in a radial direction as the three dimensional article is expanding in said radial direction for keeping the distance between the electron beam source with respect to a top surface of the three-dimensional article at a constant value.

In still another example embodiment of the present invention a moving at least one focusing lens element in a radial direction may be performed as the three-dimensional article is expanding in said radial direction for keeping the focal point of the beam source at a top surface of the three-dimensional article.

The advantage of refocusing or changing the position of the energy beam source as the three-dimensional article may be decisive for the final quality of the three-dimensional article. If not being possible to move and/or refocus the energy beam source the beam spot quality may be good with in a small range of building diameters of said three-dimensional article or set to be not so good at any building diameter of said three-dimensional article. Refocusing is taking care of beam spot quality differences that may appear as the three-dimensional article is growing in size.

In still another example embodiment of the present invention at least one heat source is provided for maintaining the heat of the manufactured three-dimensional article.

Said heat source may be arranged to heat the vertical face of the three-dimensional article, on the front side, back side or front and back side. This may assist the fusing and sintering device and for keeping a predetermined temperature of the build throughout the manufacturing time. Since almost the full vertical face of the three-dimensional article is visible said heat source may heat all parts of the three-dimensional article making sure that all parts of the three-dimensional article may have the same temperature. This may reduce the internal stresses to a minimum. This may also assist in keeping the same micro structure throughout the build.

In still another example embodiment of the invention at least a first energy beam source may be provided at a first position having a variable distance of focus at a first interval from a centre of said axis of rotation, at least a second energy beam source may be provided at a second position having a variable distance of focus at a second interval from a centre of said axis of rotation. Switching from said at least first energy beam source to said at least second energy beam source when said three-dimensional article has expanded a predetermined distance from said centre of said axis of rotation.

The advantage of this embodiment is that the different energy beam sources may be optimized for a certain depth of focus. As the build is growing a switching from a first energy beam source to a second may take place automatically as the position of the outer surface is known before hand or may be measured by a camera.

In still another example embodiment of the invention said fusing of a predetermined amount of powder is taking place less than one revolution of said rotation after said sintering of the same predetermined amount of powder has taken place. This means that the heat inserted when sintering the powder may be used in the later fusion process. The shorter the time between the sintering and fusing the less energy spill there will be.

In still another example embodiment of the present invention a first and a second powder compressor are provided in between which said powder is provided on said build support, wherein said first and second powder compressor are separated with a distance T defining the thickness of the three-dimensional article.

In an example embodiment at least the first or the second powder compressor may be arranged on said powder hopper.

In an alternative embodiment the first or the second powder compressor may be arranged fixed in said vacuum chamber.

In still another example embodiment at least the first or the second powder compressor may be arranged movable on a movable support structure inside said vacuum chamber.

The advantage of having the first and second powder compressors is that it may make sure that powder do not fall off the three dimensional article. It may also assist in making sure that the vertical walls are becoming vertical and not slanted with respect to a vertical direction as the build is growing.

In still another example embodiment said distance between said first and second powder compressor may be changed during the build and thereby allowing for a change of thickness of the three dimensional article. This may allow for a first thickness at a first radial distance and a second thickness at a second radial distance from the center of the build support. The distance between said first and sad second powder compressor may define the thickness T of the three-dimensional article. At least one of said powder compressors may be spring loaded, pressing at least a part of its surface against a vertical wall of said three-dimensional article.

In still another example embodiment of the present invention the laser beam and/or the electron beam may be scanned in a direction parallel to the axis of rotation.

The scanning of the beam in a direction parallel to the axis of rotation may effectively covers the whole sintering and/or fusing area with little or no focusing deviation.

In still another example embodiment of the present invention the power may be switched on or off for said laser beam source or electron beam source.

The switching on and off the energy beam may be used for fine tuning the energy deliver onto the three-dimensional article.

Another advantage is that complex structures are possible to manufacture which may require a jumping of the beam spot from a first position to a second position without melting in between.

In another example embodiment of the present invention said build support is rotated continuously or stepwise.

A stepwise movement may require some sort of hindering of the powder to exit from the powder hopper while the build support is not moving. This may be performed by attaching the opening of the powder hopper onto the three-dimensional article or by any shutter means provided in said powder hopper.

The advantage of continuous movement of the build support is that the powder supply may not need to be stopped and the building time is kept at a minimum.

The method according to any one of the preceding claims further comprising the step of providing said at least one powder hopper and said build support inside a vacuum chamber.

In another aspect of the invention it is provided an apparatus for forming a three-dimensional article through successive fusion of parts of applied powder. Said apparatus comprising: at least one powder hopper comprising powder to be used for forming said three-dimensional article, means for providing a predetermined amount of powder on a build support, means for directing an energy beam over said build support causing at least a portion of said powder to sinter and causing at least a portion of said powder to bond to said build support, means for directing an energy beam over said build support causing said powder to fuse in selected locations according to a model to form a first portion of said three-dimensional article, said apparatus further comprising: a motor for rotating said build support around an axis of rotation for creating said three-dimensional article, which three-dimensional article is build up layer by layer in a radial direction with respect to said axis of rotation.

Further example embodiment of the apparatus is evident from the description, figures and dependent claims. The advantage of the different embodiments of the apparatus is similar to the advantage of the corresponding method and need therefore not to be repeated in this context.

BRIEF DESCRIPTION OF THE FIGURES

The invention will be further described in the following, in a non-limiting way with reference to the accompanying drawings. Same characters of reference are employed to indicate corresponding similar parts throughout the several figures of the drawings:

FIG. 1c depicts schematic side view of said first example embodiment in FIG. 1a;

FIG. 6b depicts an enlarged side view of the first example embodiment of the powder hopper and the three-dimensional article as depicted in FIG. 6a;

FIG. 7b depicts an enlarged side view of the second example embodiment of the powder hopper and the three-dimensional article as depicted in FIG. 7a.

DETAILED DESCRIPTION OF VARIOUS EMBODIMENTS

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g. of structural material or materials) that are intended to be used for a particular purpose. Such structures, etc. may, for example, be designed with the aid of a three-dimensional CAD system.

The term "electron beam" as used herein in various embodiments refers to any charged particle beam. The source of a charged particle beam can include an electron gun, a linear accelerator and so on.

Figure 1A:
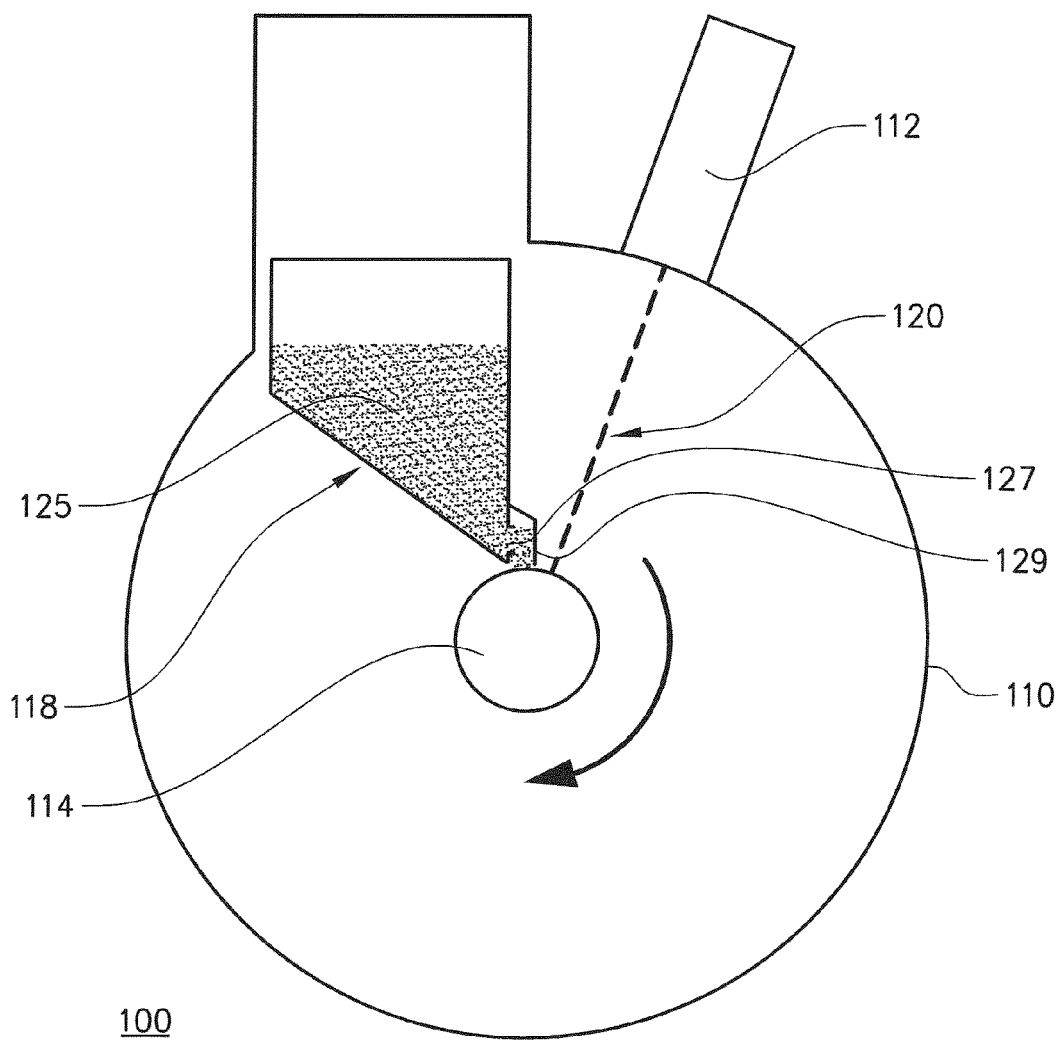
FIG. 1a depicts a schematic front view of a first example embodiment of the present invention.
Figure 1B:
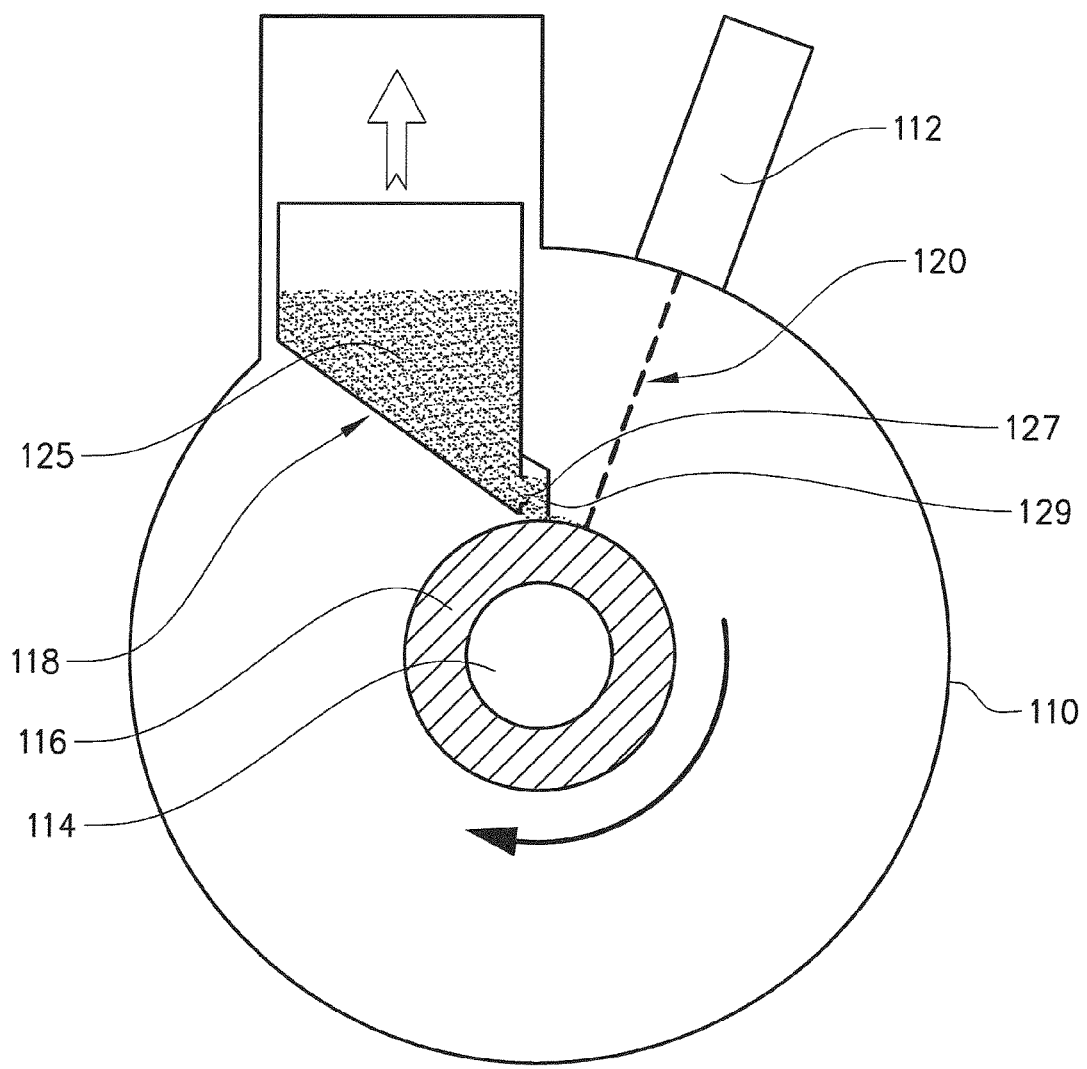
FIG. 1b depicts a schematic front view of said first example embodiment with a partly finished three-dimensional article.
Figure 1C:
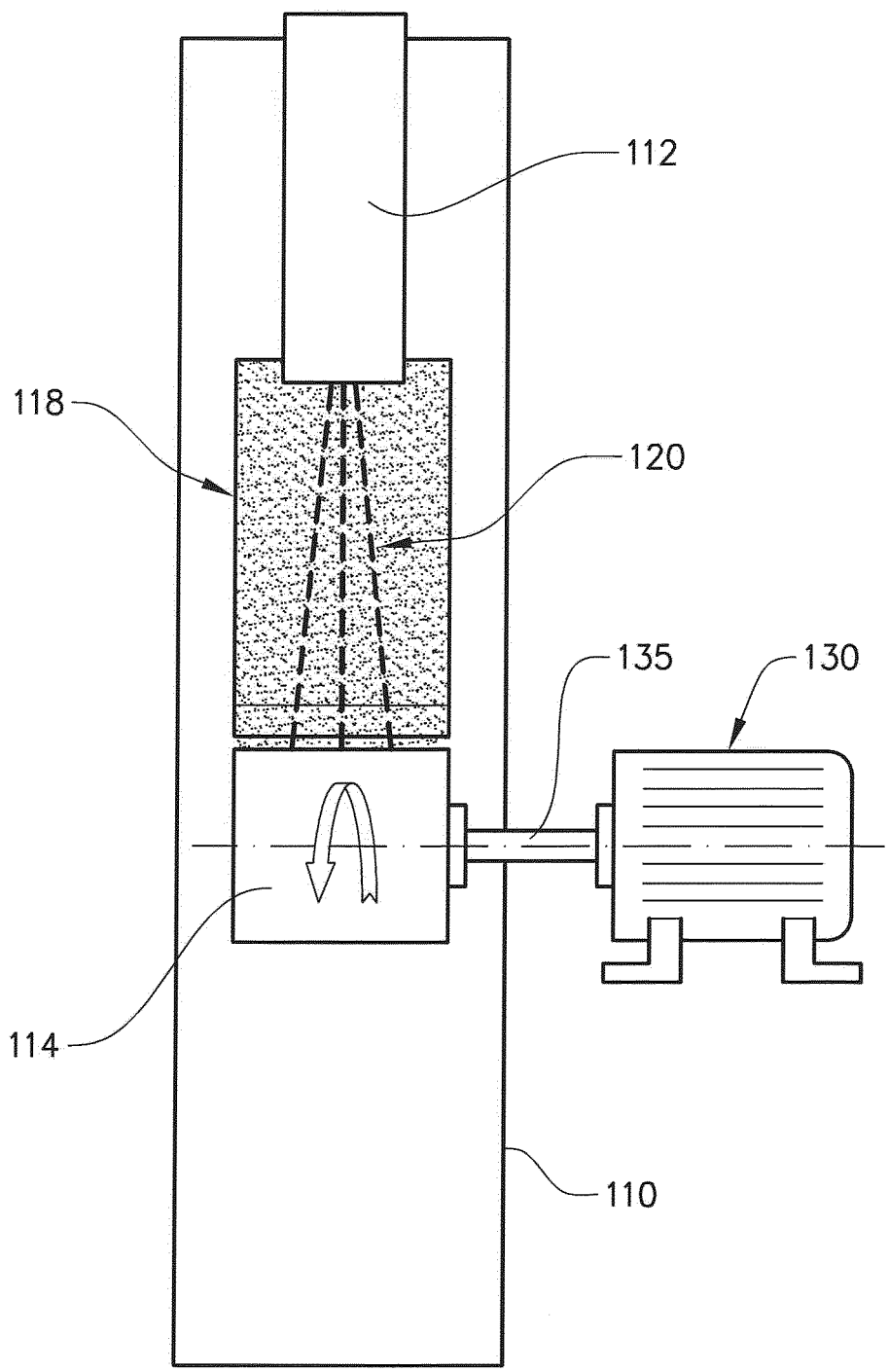

FIGS. 1a and 1b depicts front view of a part of an additive manufacturing apparatus 100 for forming a three-dimensional article through successive fusion of parts of applied powder according to the present invention. FIG. 1c depicts a side view of a part of said additive manufacturing apparatus 100 in FIG. 1a.

Said apparatus 100 may comprise at least one powder hopper 118 comprising powder 125 to be used for forming said three-dimensional article.

The apparatus 100 may further comprise means for providing a predetermined amount of powder on a build support 114. Said means for providing powder may be in the form of a powder container 118 provided with an opening 127. Said opening may be designed to let a predetermined amount of powder per time period to escape from said powder container. In an alternative embodiment said opening 127 may be provided with a shutter (not shown) for opening and closing said opening and thereby starting and stopping respectively the provision of powder onto said build support 114. In still another alternative embodiment a rake 129 may be attached to said opening 127. Said rake 129 may distribute the powder from said powder hopper 118 evenly on said build support 114.

The apparatus 100 may further comprise means for directing an energy beam 120 over said build support causing at least a portion of said powder to sinter and causing at least a portion of said powder to bond to said build support 114. Said energy beam may be a laser beam or an electron beam. In a case of said energy beam being a laser beam said means for directing said energy beam may be in the form of tiltable mirrors. In a case of said energy beam being an electron beam said means for directing said energy beam may be in the form of one or more deflecting coils. A source 112 for generating the energy beam may be an electron beam source or a laser beam source. When the powder is sintered the powder particles are lightly bonded together but not fused. Sintered powder particles may be separated into powder, i.e., a sintered body with lightly bonded powder particles may be destroyed into powder by means of suitable means for instance high pressure blasting. The sintered body may also be attached to said build support 114. Fixing the sintered body to said build support means that the sintered body will move when the building support is moving.

The apparatus may further comprise means for directing an energy beam over said build support 114 causing said powder to fuse in selected locations according to a model to form a first portion of said three-dimensional article. The fusion of a particular volume of said three dimensional article may take place after said particular volume is sintered. The model for said three-dimensional article may be stored in a controlling computer. In an example embodiment said model may be created by CAD software. The model may be sliced into suitable slices corresponding to the manufacturing method of the three dimensional article.

The apparatus may further comprise a motor 130 for rotating said build support 114 around an axis of rotation for creating said three-dimensional article 116, which three-dimensional article is build up layer by layer in a radial direction with respect to said axis of rotation. The motor 130 and said build support 114 may be attached to each other via a shaft 135. Said shaft 135 may be made of a material having a low coefficient of expansion. The three-dimensional article 116 is expanding in a radial direction seen from the centre of said build support 114. Powder may not fall off the build support because the powder particles are sintered together before they are reaching a position where said particles may fall, e.g., a position where a surface of said build support is facing downwards. Three-dimensional articles 116 may be manufactured in a layer by layer fashion in which a first layer having a first diameter is covered with a second layer having a second diameter. The difference in diameter between said first and second layer is determined by the thickness of the powder layer applied onto said build support 114.

In an example embodiment the provision of powder is continuous throughout the build of the three-dimensional article. This means that the provision of powder is not stopped before the three-dimensional article is finalised. The newly applied powder is continuously sintered in order to attach said powder on said build support or the previously manufactured layer of said three-dimensional article 116. The distance between the energy beam and the provision of powder is chosen so that the sintering is finished before any portion of the applied powder layer on said build support may be at risk falling of the build support.

In an example embodiment said powder hopper 118 and said build support 114 may be enclosed in an enclosable chamber 110. Said enclosable chamber 110 may be a vacuum chamber.

Figure 1D:
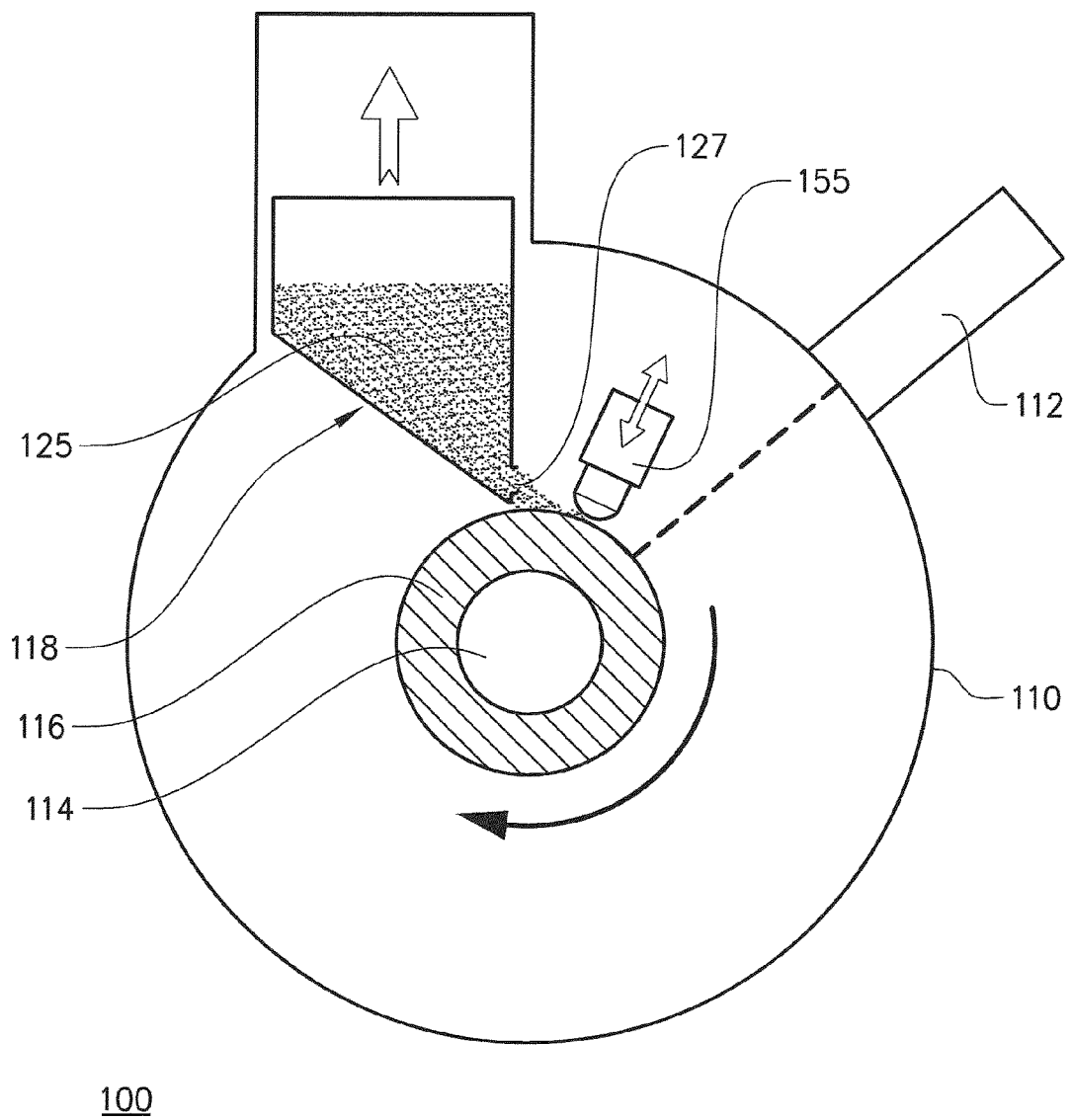
FIG. 1d depicts schematic front view of a second example embodiment of the present invention.

FIG. 1d illustrates another example embodiment of the present invention. In this embodiment a separate powder rake and powder compacting device 155 is arranged between said powder hopper 118 and the beam of the energy beam source 112. Said powder rake and compacting device is arranged movable in a radial direction from a central axis of the three-dimensional article 114. Said rake and compacting device is as its name may suggest compacting the powder which is coming from the powder hopper and applied on the outer surface of said three-dimensional article. Said rake and compacting device may be spring loaded, i.e., a spring tension may be applied on said device in order to maintain a predetermined pressure on said powder layer. Said device 155 may further be provided with a vibrating device allowing said device to vibrate and thereby compacting the powder further.

Figure 2A:
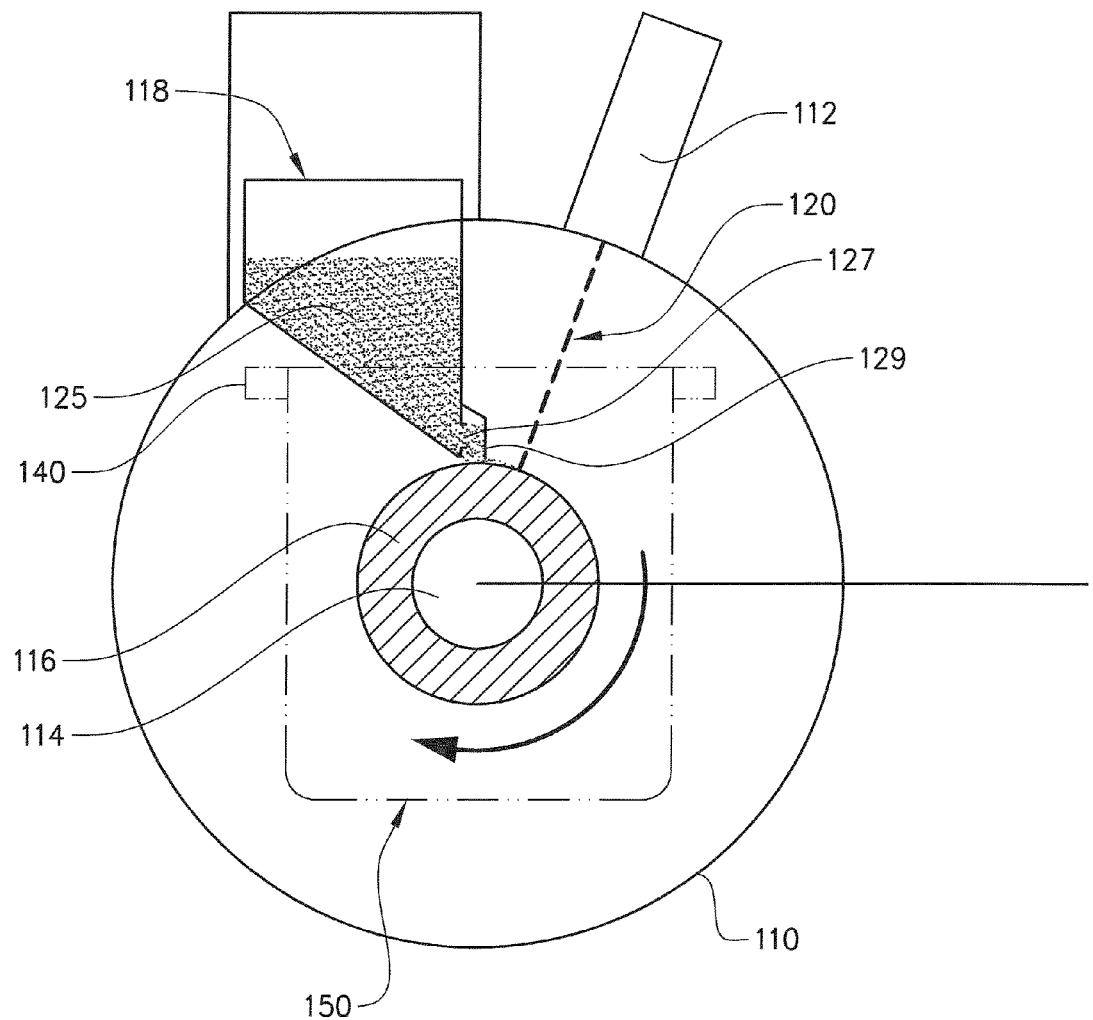
FIG. 2a depicts a schematic front view of a fourth example embodiment of the present invention.
Figure 2B:
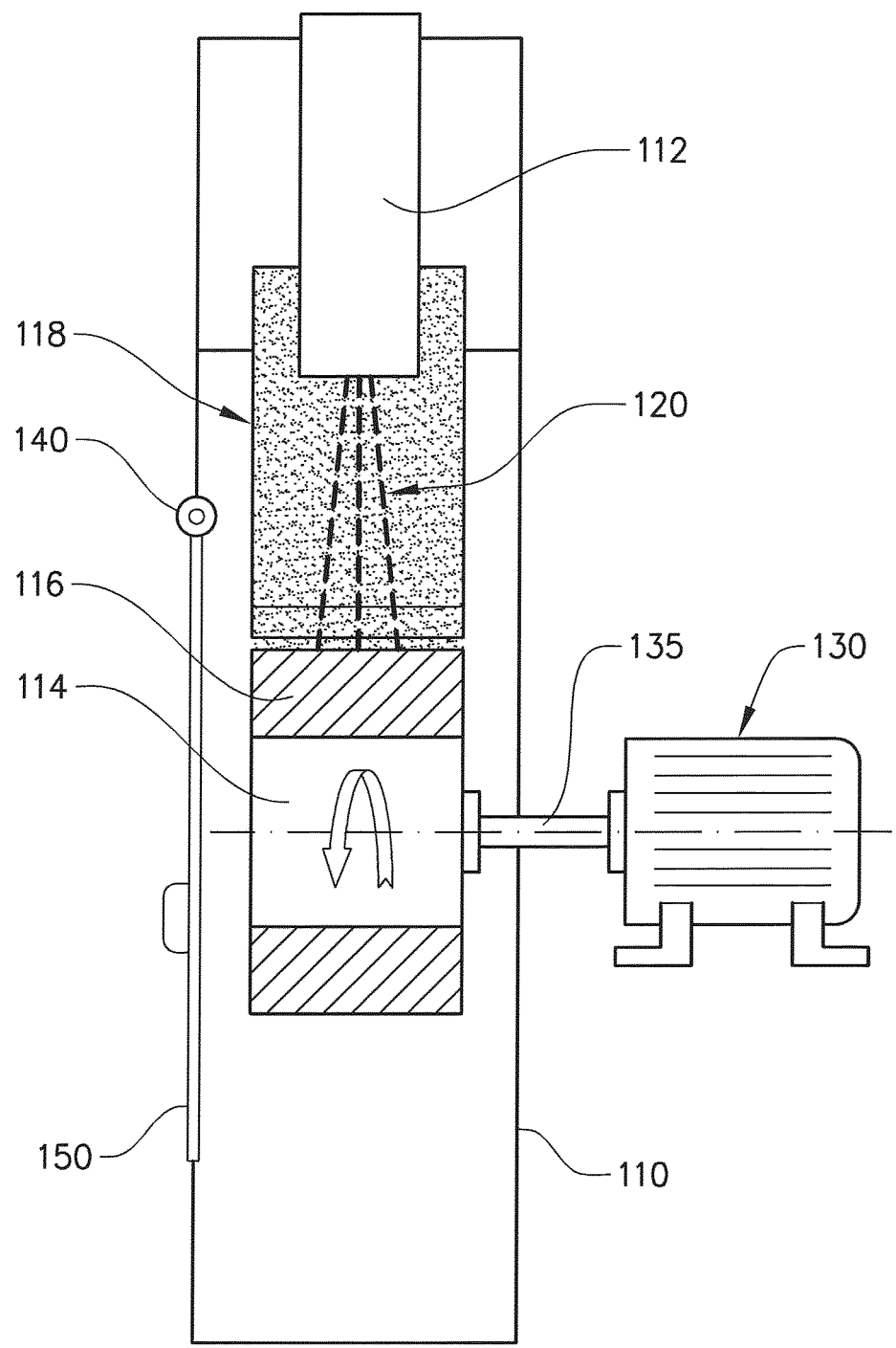
FIG. 2b depicts a schematic side view of said second example embodiment of the present invention.

In FIGS. 2a and 2b it is depicted another example embodiment of the present invention. FIG. 2a, which is a front view, is identical to FIG. 1b besides that FIG. 2a comprises a door 150 for closing the enclosable chamber 110. Said door is attached to the enclosable chamber 110 by a hinge 140. The side view in FIG. 2b illustrates that the shaft 135 attaching the motor 130 to said build support 114 is passing through said enclosable chamber 110. In an example embodiment appropriate sealing is provided between said shaft 135 and said enclosable chamber so that vacuum conditions may be achieved inside said enclosable chamber 110.

In still another example embodiment said apparatus further comprising means for providing said powder hopper 118 movable in a radial direction for keeping a distance between said powder hopper 118 and an outer surface of said three-dimensional article 116 at a constant predetermined value. Said means for providing said powder hopper movable may be in the form of a motor connected to said powder hopper via gear(s) and/or chain(s) and/or belts. The means for moving said powder hopper may also be pneumatic or hydraulic. The distance between said powder hopper and said outer surface of said three-dimensional article 116 may be maintained by measuring the distance between said powder hopper and said outer surface. If the distance is falling below a predetermined limit said powder hopper is raised a predetermined distance in order to fall within an acceptable range of distance from said outer surface of the three-dimensional article 116. In an alternative embodiment no measurement is taking place in order to keep said distance between said powder hopper and said outer surface of the three-dimensional article within a predetermined range. It is assumed from the beginning that the speed of rotation in combination with the size and shape of the opening 127 of the powder hopper 118 and the type of powder to be distributed on said build support 114 will create a predetermined thickness of powder. For each revolution of said build support said powder hopper is raised a distance corresponding to said thickness of the powder. By varying the speed of said build support the thickness may be varied. A slower rotational speed of said build support may result in a thicker powder layer and a faster rotational speed of said build support may result in a thinner powder layer. The fact that the speed of rotation of said build support is affecting the thickness of said powder layer on said build support may be used in order to keep said thickness within a predetermined range.

In an example embodiment of the present invention the thickness of the powder layer may be altered by changing the distance of the opening 127 and the optional rake 129 of the powder hopper 118 to the outer surface of the three-dimensional article 116. A larger distance between the opening and the outer surface the larger the amount of powder to exit from said opening and the thicker the powder layer. In an alternative embodiment the opening is pointing in a direction towards the outer surface of the three-dimensional article 116. This means that the opening may be closed by said outer surface of said three-dimensional article if the distance between said outer surface and said opening is zero. At this zero distance no powder is escaping from the powder hopper. Increasing the distance from said powder hopper to said outer surface will allow powder to exit from said powder hopper. By adjusting said distance between said opening of said powder hopper and said outer surface of said three-dimensional article may allow for fine tuning of the thickness of the applied powder layer.

As the three-dimensional article is growing in size, i.e., the more layer that is attached to said build support, the larger the outer diameter will be. If said rotational speed would be kept at a constant speed the thickness of the powder layer at a larger diameter will be thinner than the powder layer at a smaller diameter. By adjusting the speed of rotation with the size of the three-dimensional article, a constant thickness of the applied powder may be achieved when using a powder hopper providing a predetermined amount of powder per time period. In an example embodiment of the present invention a constant angular velocity of the outer surface of the three-dimensional article will maintain a predetermined thickness of the applied powder layer irrespective of the diameter of the three-dimensional article.

In another example embodiment the angular velocity of the outer surface of the three-dimensional article may be altered for changing the thickness of the applied powder layer. A faster angular velocity will provide for a thinner applied powder layer compared to a slower angular velocity for a given amount of powder exiting the opening 127 of said powder hopper 118.

In still another example embodiment said angular velocity of said outer surface of said three-dimensional article may be altered in combination with an altered distance of said opening of said powder hopper to said outer surface of said three-dimensional article. In this embodiment two independent parameters may be changed for changing the thickness of said powder layer, i.e., the distance of the opening of said powder hopper to said outer surface of said three-dimensional article and the angular velocity of the outer surface of said three-dimensional article.

Figure 4A:
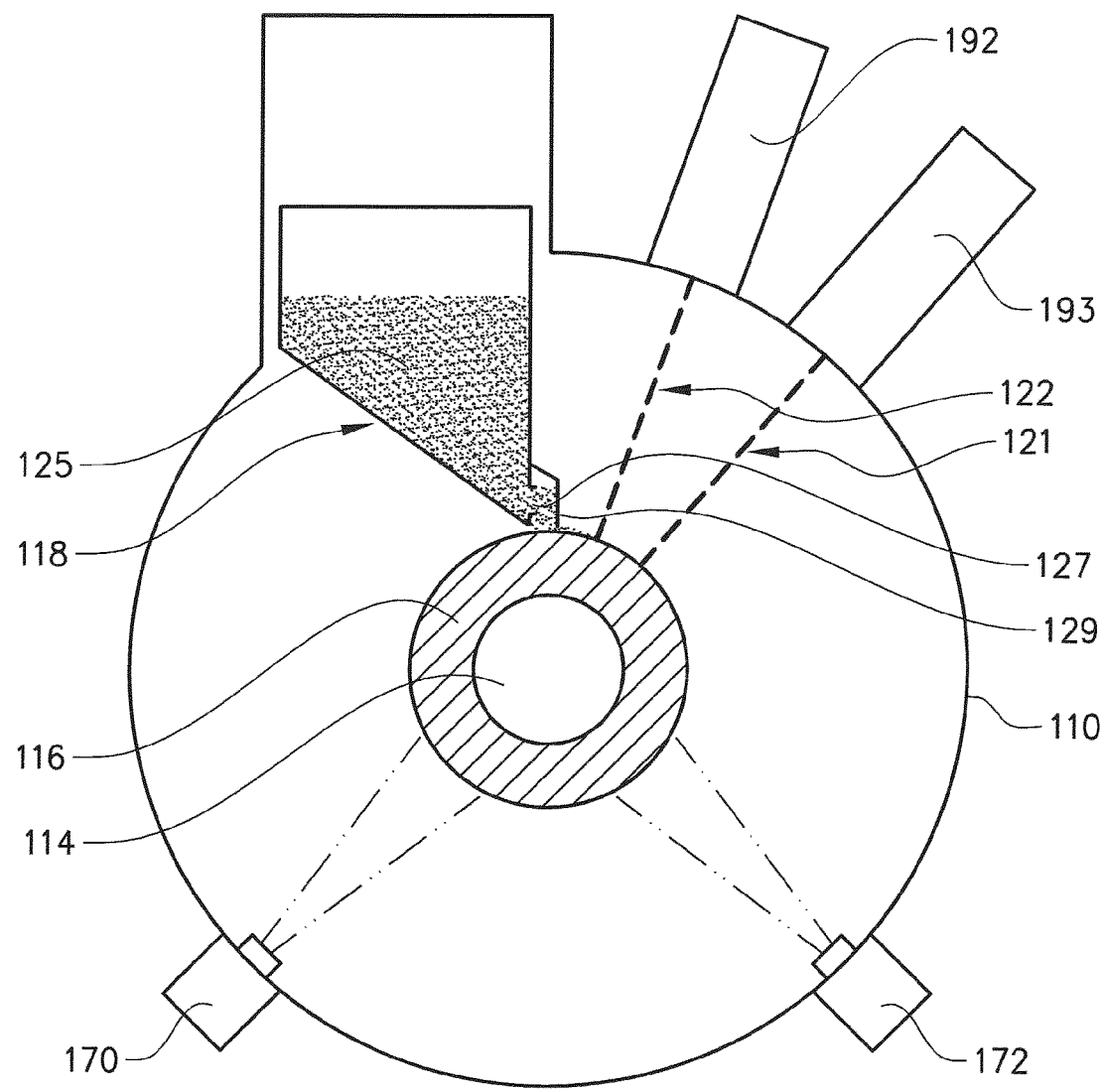
FIG. 4 depicts a schematic front view of a sixth example embodiment of the present invention.
Figure 4B:
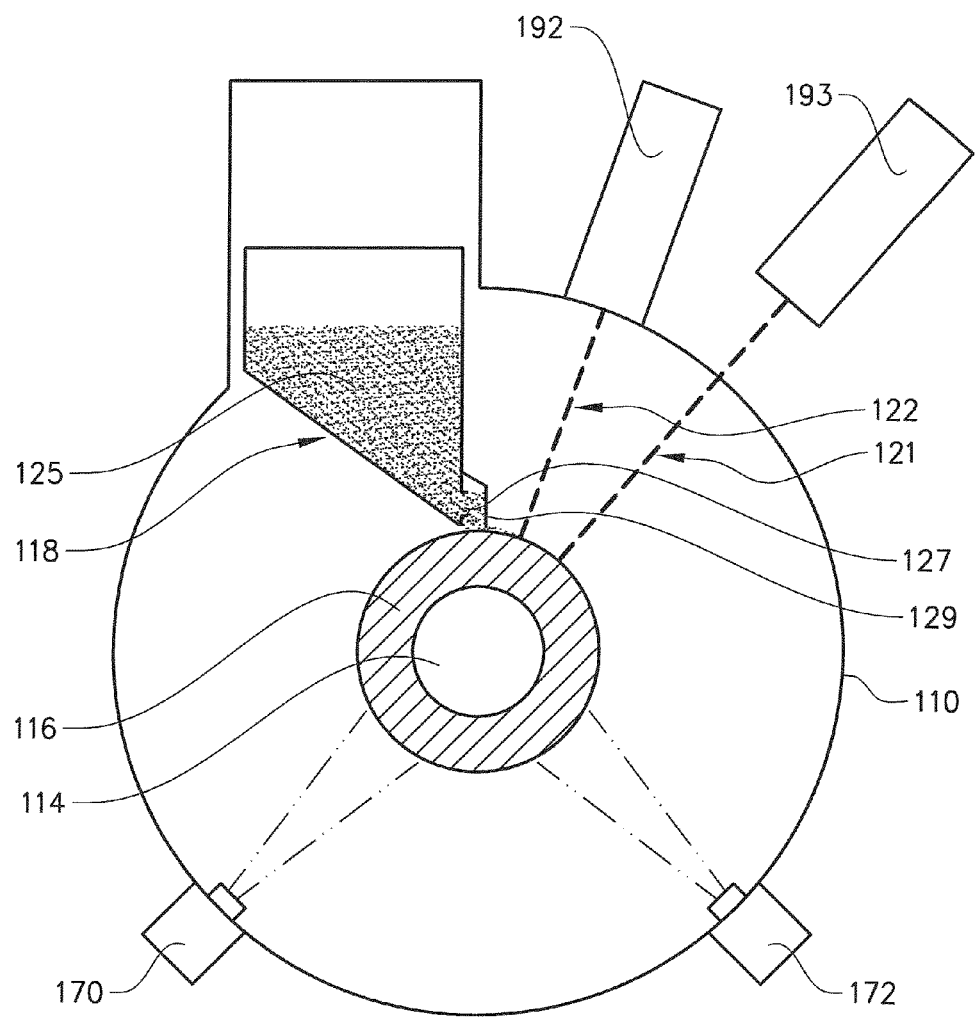

In still another example embodiment of an additive manufacturing apparatus 100 depicted in FIG. 4 at least an electron beam source 192 generating an electron beam 122 is used for sintering said powder and at least a laser beam source 193 generating a laser beam 121 is used for fusing said powder. The electron beam source 192 is arranged closer to said powder hopper compared to said laser beam source 193 since the electron beam is used for sintering which is taking place before said fusing of the same powder material. In FIG. 4 it is only disclosed one electron beam source and one laser beam source. Of course, multiple electron beam sources may be used as well as multiple laser beam sources. In FIG. 4 it is also a first optional camera 170 and a second optional camera 172. Said first and second cameras may be used for detecting defects, temperature and/or surface characteristics of the top surface of the three-dimensional article 116.

In another example embodiment of an additive manufacturing apparatus 100 at least one laser beam source generating at least one laser beam is used for sintering said powder and at least one electron beam source generating at least one electron beam is used for fusing said powder.

In still another example embodiment of an additive manufacturing apparatus 100 at least a first electron beam source generating at least a first electron beam is used for sintering said powder and at least a second electron beam source generating at least a second electron beam is used for fusing said powder.

In still another example embodiment of an additive manufacturing apparatus 100 at least a first laser beam source generating at least a first laser beam is used for sintering said powder and at least a second laser beam source generating at least a second laser beam is used for fusing said powder.

Figure 3A:
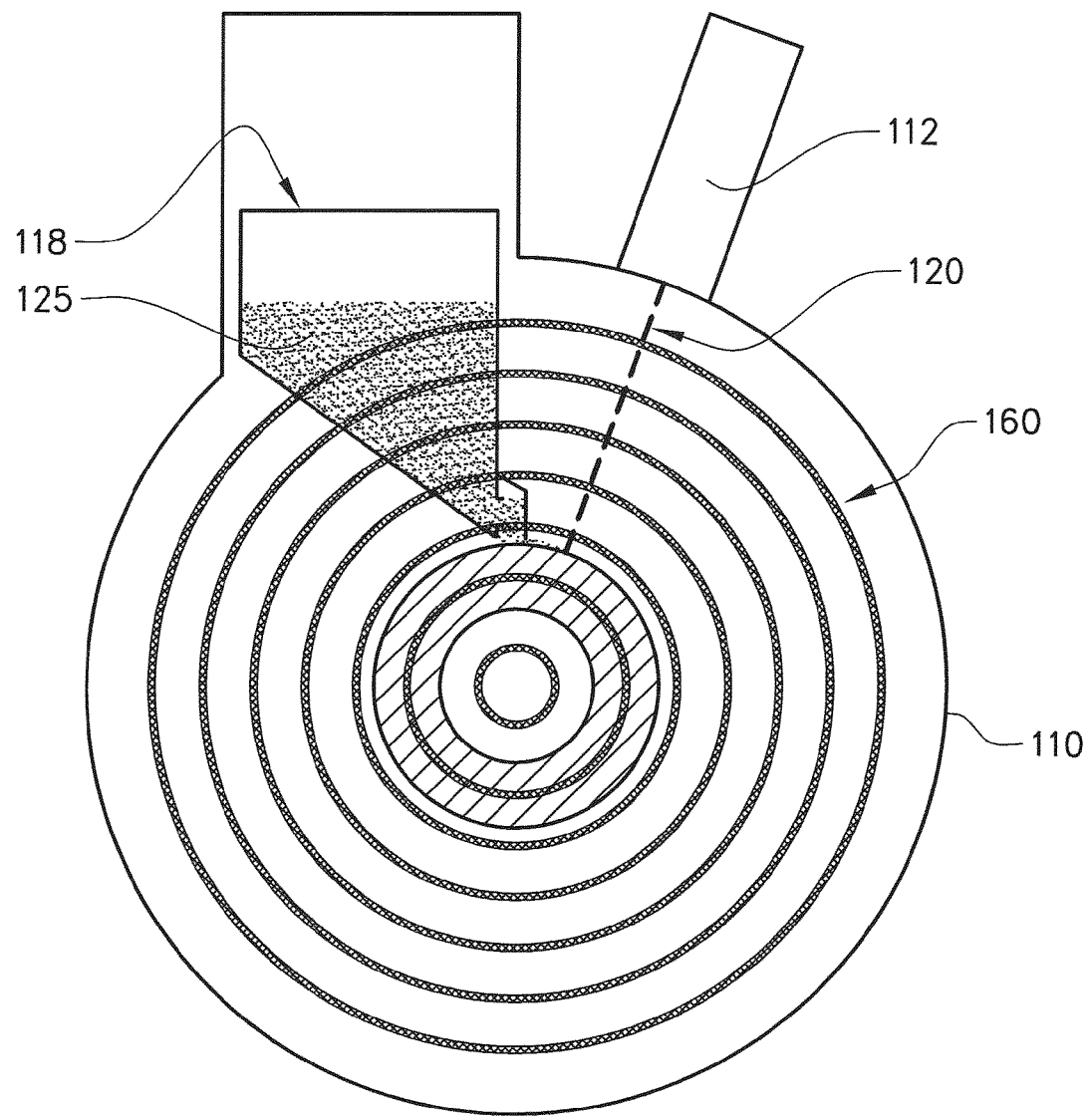
FIG. 3a depicts a schematic front view of a firth example embodiment of the present invention.
Figure 3B:
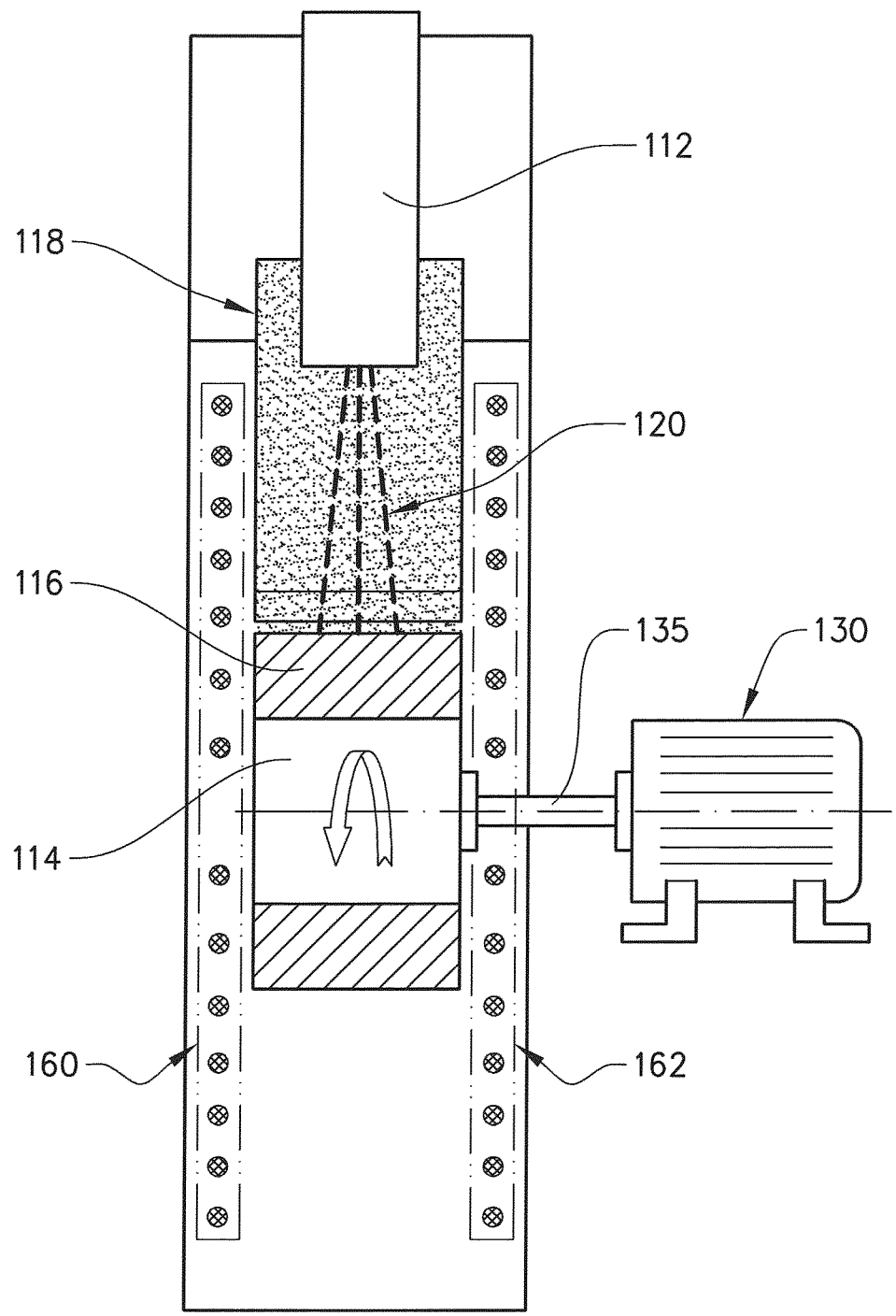
FIG. 3b depicts a schematic side view of said fifth example embodiment of the present invention.

In an alternative embodiment at least one heat source is provided for maintaining the heat of the manufactured 3-dimensional article. In FIG. 3a it is depicted an example embodiment of such heat source for maintaining the heat of the 3-dimensional article. In FIG. 3a it is provided a number of heat elements 160, which could be resistive or of IR type. The heat elements may be arranged as in FIG. 4a, i.e., small diameter heat source are provided for heating an origin of the 3-dimensional article. Bigger diameter heat sources are arranged so as to heat later manufactured parts of the 3-dimensional article. In an example embodiment a control unit may switch on more and more heat sources as the 3-dimensional build is growing. In another example embodiment the power may be altered during the manufacturing time of the 3-dimensional article for each and every one of the heat sources 160 so as to achieve a desired heat distribution in said 3-dimensional article. In still another example embodiment at least one heat source may be switched on and off in a predetermined way for producing a desired powder distribution in said 3-dimensional article. FIG. 3b depicts a side view of the arrangement as depicted in FIG. 3a. From FIG. 3 it is illustrated that an optional set of heat sources 162 may be applied on the opposite side as the heat sources 160, thereby heating the three-dimensional article from both sides.

In still another example embodiment a first energy beam source may be provided at a first position having a variable distance of focus at a first interval from a centre of said axis of rotation and at least a second energy beam source may be provided at a second position having a variable distance of focus at a second interval from a centre of said axis of rotation. A switch for switching from said first energy beam source to said at least second energy beam source when said three-dimensional article has expanded a predetermined distance from said centre of said axis of rotation. A first energy beam source may be used for building the inner part of a three-dimensional article and a second energy beam source may be used for building the outer part of the three-dimensional article. The first and second energy beam sources are suitable for focussing the energy beam at a first and second interval of distance of focus.

In another example embodiment said electron beam source may be arrange movable, i.e., the distance from the electron beam source to said outer surface of said three-dimensional article may be kept constant by moving said electron beam source outwards (radial direction) as the three-dimensional article is growing in size.

Figure 5:
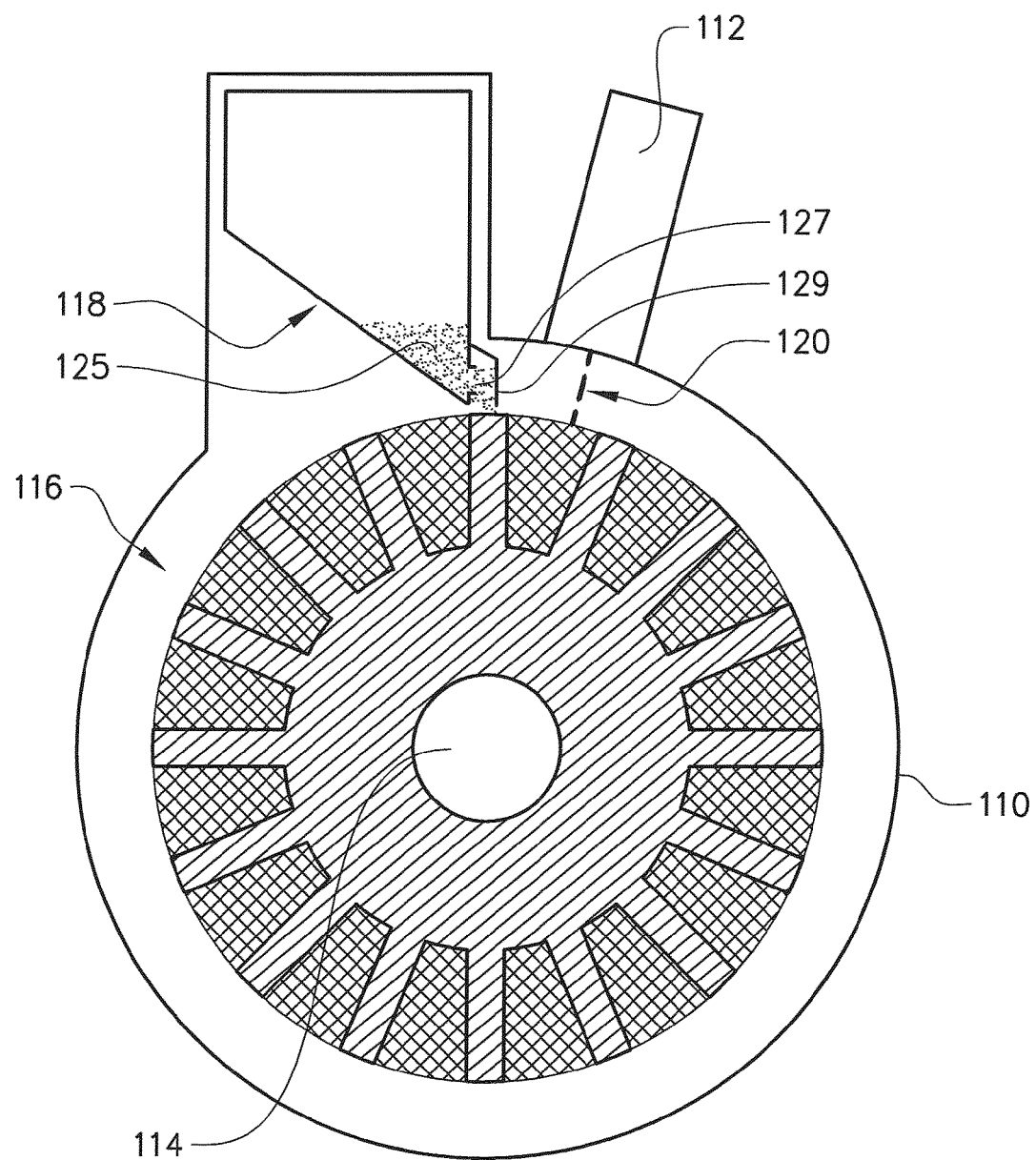
FIG. 5 depicts a schematic front view of a seventh example embodiment of the present invention.

In FIG. 5 it is depicted an example 3-dimensional article 116 which may be suitable to build with the inventive apparatus. The 3-dimensional article depicted in FIG. 5 may for instance be a compressor wheel or a turbine wheel for an exhaust turbo, a rotating disc in a jet engine, air compressor wheel etc. It may also be fully possible to build a number of discrete parts with the inventive method and apparatus, for instance a number of discrete rotor blades for turbine engines.

The build support 114 may be a forged shaft for an exhaust turbo turbine wheel. The build support 144 can be pre manufactured having desired material properties for a desired application. Turbine wheel blades are manufactured onto said build support (turbine shaft) which may be in another material compared to the build support. In an example embodiment the turbine shaft made be made of a desired steel compound and said turbine blade may be made of Ti or Ti6Al4V.

In an alternative embodiment said build support may be a used compressor wheel which is partially broken, e.g., parts of one or several of the compressor wings may be broken. Said compressor wheel may be inserted in the machine. Before making it possible to insert already manufactured structures, i.e., not just a homogenous shaft, the height of all wings have to be set to an equal distance from the central axis, i.e., in the case of compressor wings the compressor shaft. This can be done before inserting the partially broken compressor wheel in the additive manufacturing machine by removing portions of the blades in a suitable grinding method or to turn the blades partially down in a lathe.

Powder may be preheated in a separate equipment in order to sinter, not fuse, the powder particles together with the three dimensional article to repair. In an example embodiment said three-dimensional article to repair may be inserted in a prefabricated form together with powder and said form with said powder and said three-dimensional article may be inserted in an equipment for sintering the powder together with said three-dimensional article to repair. Out of said equipment may come a three-dimensional article which is suitable for adding a predetermined amount of material in the inventive apparatus and method as disclosed herein above and below.

Figure 6A:
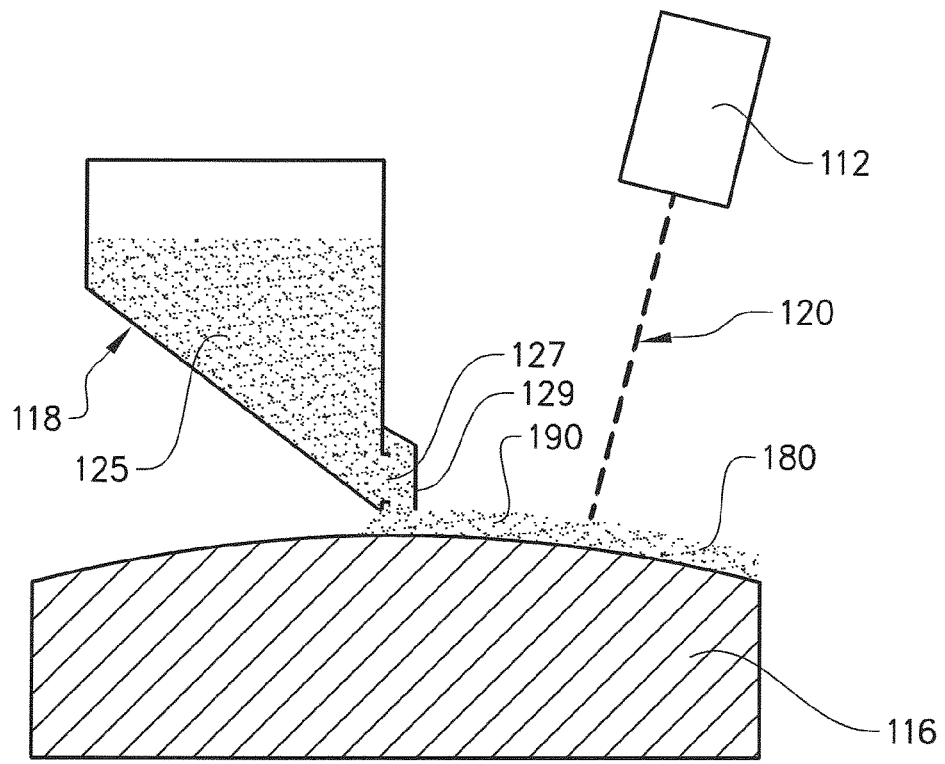
FIG. 6a depicts an enlarged front view of a first example embodiment of the powder hopper and the three-dimensional article according to present invention.
Figure 6B:
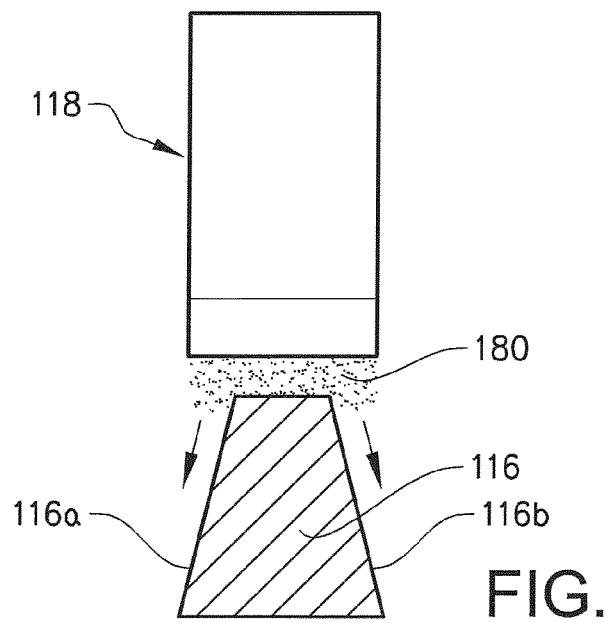

FIGS. 6a and 6b depicts an enlarged front view and side view respectively of the powder hopper together with the 3-dimensional article. When powder 125 from the powder hopper 118 is applied on said three-dimensional article there is a certain distance from said powder hopper to said energy beam where the powder is not sintered. In the area where the powder is not sintered it may be a risk that powder will fall off the three-dimensional article 116 close to its front-side 116a and back-side 116b resulting in a three-dimensional article which will become thinner as it grows radially between its front side 116a and its back-side 116b as depicted in FIG. 6b.

Figure 7A:
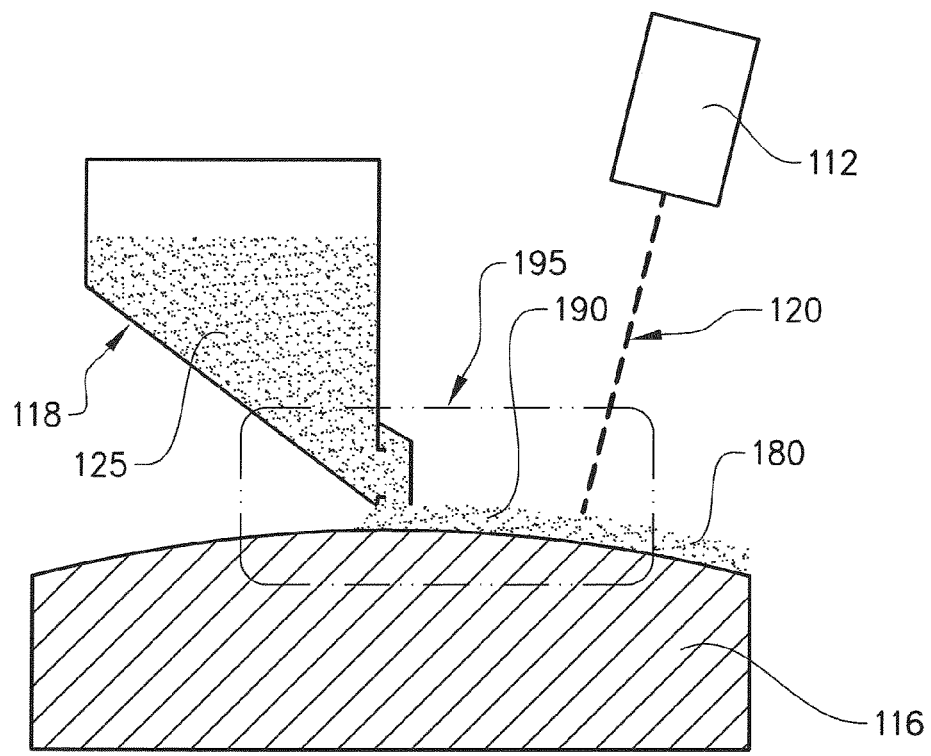
FIG. 7a depicts an enlarged front view of a second example embodiment of the powder hopper and the three-dimensional article according to present invention.
Figure 7B:
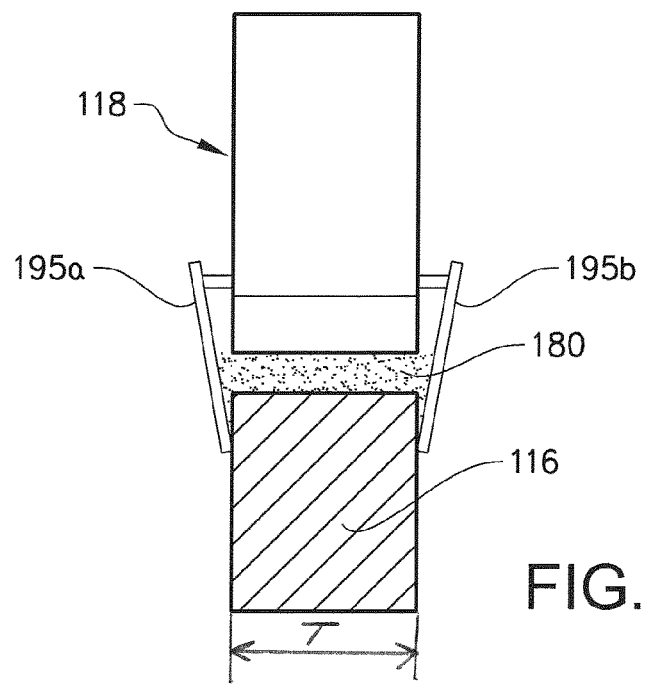

In order to maintain the thickness T between the front side 116a and the back side 116b of the three-dimensional article 116, a powder compressor 195 as depicted in FIG. 7a and FIG. 7b may be attached to the powder hopper 118.

Said powder compressor 195 may comprise a first and a second powder compressor element which may be arranged on said powder hopper essentially in parallel with a radial direction to said axis of rotation, where said powder is provided in between said first and second powder compressor elements 195a, 195b respectively. The first and second powder compressor elements 195a and 195b respectively may make it possible to keep powder material on the build support or the top surface of the three-dimensional article without falling off said top surface or and thereby creating three-dimensional article which may be non-deficient. In an example embodiment said first and second powder compressor elements 195a, 195b may be arranged with a spring force to the already manufactured three-dimensional article 116. The spring force may make sure that there is a tight seal between the three-dimensional article and the first and second compressor elements, which in turn make sure that no powder will fall off and also make sure that the thickness between the front side 116a and the back side 116b of the three-dimensional article is kept at constant. The compressor elements 195a, 195b may be made of steel, titanium, inconel or another super alloy. It may also be made of ceramic. In an alternative embodiment at least a first powder compressor 195a, 195b, may be arranged fixed inside said vacuum chamber. In still another example embodiment at least one powder compressor 195a, 195b may be arranged movable on a separate structure which.

In still another example embodiment the apparatus according to the present invention may further comprising means for refocusing the electron beam and/or the laser beam as the three dimensional article is expanding.

Said means for moving the electron beam source or the laser source in a radial direction as the three dimensional article is expanding for keeping the distance between the electron beam source or laser source with respect to a top surface of the three dimensional article at a constant value may be a mechanical for instance by belt(s), gear wheel(s), chain(s) connected to an electrical motor.

A vacuum bellow may be arranged between the electron gun and/or laser gun and the vacuum chamber for allowing the vacuum to be maintained as the electron beam source and/or laser beam source is moving out in a radial direction from the central axis of said three-dimensional article.

The apparatus according to any one of the preceding claims, further comprising means for moving at least one focusing lens element in a radial direction as the three dimensional article is expanding for keeping a focal point of said laser beam source at a top surface of the three dimensional article.

Figure 8:
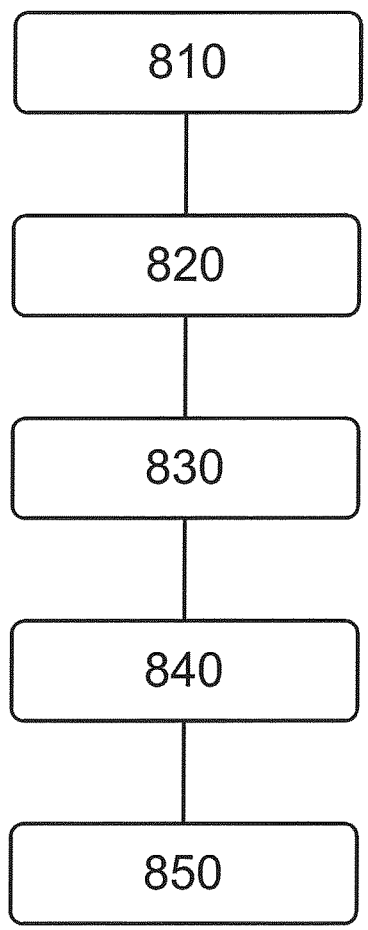
FIG. 8 depicts a flow chart for a method for forming a three-dimensional article through successive fusion of applied powder.

FIG. 8 depicts a flow chart for a method for forming a three-dimensional article through successive fusion of applied powder.

In a first step 810 of said method at least one powder hopper is provided, which powder hopper comprises powder to be used for forming said three-dimensional article.

In a second step 820 a predetermined amount of powder is provided at a build support. Said predetermined amount of powder may be provided through an opening from said powder hopper. The powder hopper may be arranged above said build support. Alternatively there is a mechanical arrangement for transporting a sufficient amount of powder escaping from the powder hopper to said build support.

In a third step 830 an energy beam is directed over said build support causing at least a portion of said powder to sinter and causing at least a portion of said powder to bond to said build support. By sintering the powder particles together a body of sintered particles are formed on said build support. The sintering means that the powder particles are lightly bonded to each other making it possible after sintering to break the bonding between the particles may suitable means, for instance blasting, and thereby destroying the body into powder again. In the sintering step the powder particles may not only bonded to each other forming said body but may also be bonded to the build support.

In a fourth step 840 an energy beam is directed over said build support causing said powder to fuse in selected locations according to a model to form a first portion of said three-dimensional article. The model may be created with a suitable CAD tool. The CAD model may be sliced into predetermined number of cross sections corresponding to cross sections of the three-dimensional article to be built. The thickness of said cross sections corresponds to the powder thickness of a predetermined powder layer on said build support. The energy beam is directed by at least one appropriate deflection coil in the case of an electron beam as said energy beam and a tiltable mirror in the case of a laser beam as said energy beam.

In a fifth step 850 said build support is rotated around an axis of rotation for creating said three-dimensional article, which three-dimensional article is build up layer by layer in a radial direction with respect to said axis of rotation. Powder may escape continuously from the powder hopper as the build support is rotating. The rotational speed of the build support is adapted to the outer diameter of the three-dimensional article for creating the same thickness for each applied layer on the build support. This means for instance that the rotational speed may be decreased for an increasing thickness given the same amount of powder per time period escaping from the outlet of said powder hopper onto said build support. An alternative way for making sure that the same layer thickness is applied is to increase the amount of powder as the diameter of the three-dimensional article is increasing. This may be done by increasing the distance between said powder hopper and said outer surface of said three-dimensional article and/or decrease the rotational speed of said three-dimensional article for maintaining the angular velocity of the outer surface of said three-dimensional article.

The powder in said powder hopper may be any sort of metal material either as a pure metal, as an alloy or as a mixture of different metals in powder form. Other types of materials may also be used, however if using an electron beam as said energy beam said powder material has to be electrically conductive. If using a laser beam as said energy beam any kind of material may be used including electrically non-conductive materials.

In an example embodiment of the invention said powder hopper is provided movable in a radial direction with respect to said axis of rotation for keeping a distance between said powder hopper and an outer surface of said three-dimensional article at a constant predetermined value. It may be important to keep the distance between the powder hopper and said build support at a constant distance throughout the build sequence of the three-dimensional article for providing powder layers with the same thickness and the same surface quality. Varying the distance between the powder hopper and the outer surface of the three-dimensional article may affect those two parameters and thereby may affect the quality of the final three-dimensional article.

In an example embodiment of the present invention the distance between said powder container and said outer surface of said three-dimensional article may be kept constant by moving said container with feed-back information from measurement of the distance between the container and said surface. The measurement may be made by a camera taking a picture of said distance. In an alternative embodiment an interferometer may be used for measuring the distance from said outer surface of the three-dimensional article to a fixed position. Instead of measuring the distance said movement of said powder container may be known before starting the manufacturing. Since the thickness of the powder layer may be known before starting the manufacturing one may know how much the three-dimensional article is increasing its dimension per revolution. The movement of said powder container may be made out of said information.

The same measurement and/or predetermined adjustment of the powder hopper may be used for adjusting the position of the laser beam source and/or the electron beam source.

Said powder may be sintered using said electron beam and fused using at least said laser beam. The sintering and fusing may be performed simultaneously but for different areas of the three-dimensional article. Alternatively the sintering is taking place for a first area and thereafter the fusion is taking place for the same first area, when said fusion is taking place said sintering is not performed for a second area.

Said powder may also be sintered using said electron beam and fused using at least said laser beam. Here again, the fusion and sintering may take place simultaneously for different areas or serially for the same area with no overlap in performing fusing for a first area and sintering for a second area.

Said powder may also be sintered using a first electron beam source and fused using at least a second electron beam source. Here again, the fusion and sintering may take place simultaneously for different areas or serially for the same are with no overlap in performing fusing for a first area and sintering for a second area.

Said powder may also be sintered using a first laser beam source and fused using at least a second laser beam source. Here again, the fusion and sintering may take place simultaneously for different areas or serially for the same are with no overlap in performing fusing for a first area and sintering for a second area.

The electron beam and/or the laser beam may be refocused as the three dimensional article is expanding.

The electron beam source may be refocused by moving the source in a radial direction as the three dimensional article is expanding for keeping the distance between the electron beam source with respect to a top surface of the three dimensional article at a constant value.

The laser beam may be refocused by moving at least one focusing lens element in a radial direction as the three dimensional article is expanding for keeping the focal point of the laser beam source at a top surface of the three dimensional article.

At least one heat source may be provided for maintaining the heat of the manufactured 3-dimensional article. Said heat source may be in the form of a resistive heater and/or a IR heater. The heat sources may be provided on a back side of the three-dimensional article and/or on the front side of the three dimensional article. The distance of the heater to said front and/or back side of the three-dimensional article may be varied for each heating element for varying the power to said build.

At least a first energy beam source may be provided at a first position having a variable distance of focus at a first interval from a centre of said axis of rotation. At least a second energy beam source may be provided at a second position having a variable distance of focus at a second interval from a centre of said axis of rotation.

Said at least first energy beam source may be switched to said at least second energy beam source when said three-dimensional article has expanded a predetermined distance from said centre of said axis of rotation. By using different energy beam sources for building different parts of the three-dimensional article may improve the final result of the final article. This is because different energy beam sources being positioned fixed relative to the central axis of the build support may have an optimal focal distance range being partly overlapping each other, i.e., a first energy beam source may have a first focal distance range which is partly overlapping a second energy beam source focal distance range. When these two energy beam sources being fixed in position relative the central axis of the build support it may be very suitable to change the sintering and/or fusing from one source to another when a first focal distance is out of range but within the range of the other.

Figure 1E:
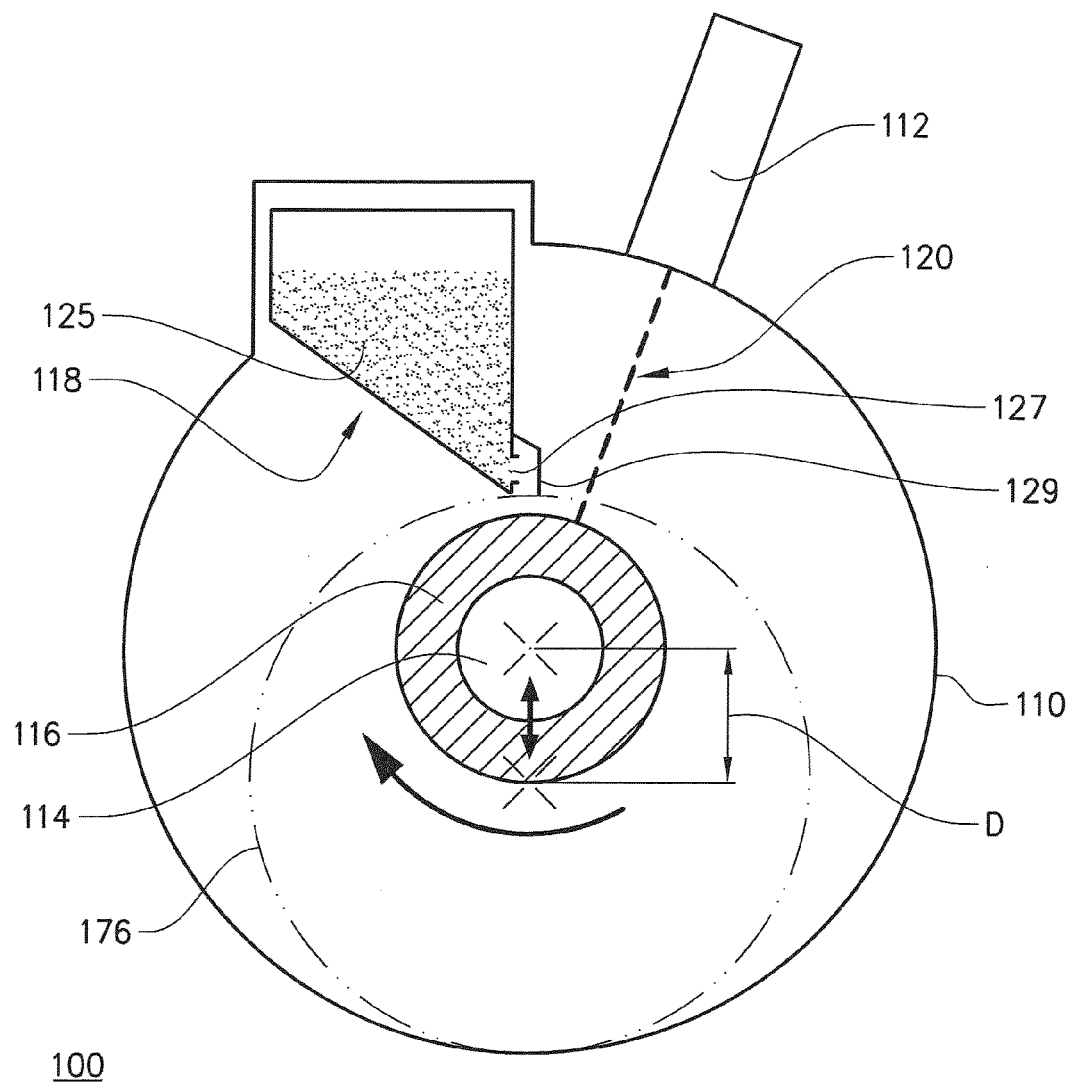
FIG. 1e depicts schematic side view of a third example embodiment of the present invention.

In another example embodiment of the present invention the distance between the outer surface of the three-dimensional article and the powder hopper and/or the energy beam source may be kept at a fixed distance by moving the central axis of the three-dimensional article. An example embodiment of how this may look like is illustrated in FIG. 1e. For a small diameter of the three dimensional article, as illustrated by 116 in FIG. 1e said central axis of the three dimensional article is at a first position. When the three-dimensional article is finished, denoted by 176 in FIG. 1e, the central axis of said three-dimensional article is moved to a second position. In FIG. 1e said three-dimensional article has been moved a distance D between said first and second positions, which is equal to the radial growth of the three-dimensional article between said first and second positions.

Said fusing of a predetermined amount of powder may take place less than one revolution of said rotation after said sintering of the same predetermined amount of powder has taken place. In order to speed up the process the fusion may be performed at any angle interval within a complete revolution from a sintering of the same area. In an alternative embodiment the fusion is taking place with the same energy beam source as the sintering source and that may be performed by using the radiation source alternating for sintering and for fusing.

A first and a second powder compressor may be arranged on said powder hopper so that powder is provided in between said first and second powder compressor. The provision of said first and second powder compressor prohibit powder from falling off the three-dimensional article before being sintered to the previous fused and/or sintered powder layer.

The laser beam and/or the electron beam may be scanned in a direction parallel or perpendicular to the axis of rotation. This may effectively cover each position of the applied powder layer with said energy beam enabling fusion and/or sintering to take place at any desired position within a given angular section of said three-dimensional article.

The power may be switched on or off for said laser beam source and/or electron beam source. This enables a controllable variable power transmission from the electron and/or laser beam onto said three-dimensional article.

Said build support may be rotated continuously or stepwise. With a continuously rotated build support the provision of powder may also be constant for creating a evenly and controlled thickness of the powder layer on said build support. In case of a stepwise movement of the build support the powder supply may be interrupted while said build support is not rotating.

Said at least one powder hopper and said build support may be provided inside a vacuum chamber. This enables manufacturing of three-dimensional articles without contaminations from the ambient air. It also enables a controlled environment such as a non-reactive gas to be supplied into the chamber such as Nitrogen, Helium and/or Argon. In case of using an electron beam source as the means for the energy beam, at least a part of said electron beam source may be arranged inside said vacuum chamber.

The invention is not limited to the above-described embodiments and many modifications are possible within the scope of the following claims. Such modifications may, for example, involve using a different source of ray gun than the exemplified electron beam such as laser beam. Other materials than metallic powder may be used such as powders of polymers and powders of ceramics.

The invention claimed is:

1. A method for forming a three-dimensional article through successive fusion of applied powder, said method comprising the steps of
  providing at least one powder hopper comprising powder to be used for forming said three-dimensional article;
  providing a predetermined amount of powder at a build support, wherein an axis of rotation of said build support is provided in a horizontal direction;
  directing an energy beam over said build support causing at least a portion of said powder to sinter and causing at least a portion of said powder to bond to said build support;
  directing an energy beam over said build support causing said powder to fuse in selected locations according to a model to form a first portion of said three-dimensional article;
  rotating said build support around said axis of rotation for creating said three-dimensional article, which three-dimensional article is build up layer by layer in a radial direction with respect to said axis of rotation;
  providing powder continuously throughout the forming of the three-dimensional article; and
  sintering newly applied powder continuously in order to attach said powder on at least one of said build support or a previously manufactured layer of the three-dimensional article.

2. A method for forming a three-dimensional article through successive fusion of applied powder, said method comprising the steps of:
  providing at least one powder hopper comprising powder to be used for forming said three-dimensional article;
  providing a predetermined amount of powder at a build support;
  directing an energy beam over said build support causing at least a portion of said powder to sinter and causing at least a portion of said powder to bond to said build support;
  directing an energy beam over said build support causing said powder to fuse in selected locations according to a model to form a first portion of said three-dimensional article; and
  rotating said build support around an axis of rotation for creating said three-dimensional article, which three-dimensional article is build up layer by layer in a radial direction with respect to said axis of rotation, wherein at least one of:
  said powder is sintered using at least one electron beam and fused using at least said laser beam;
  said powder is sintered using at least one laser beam and fused using at least one electron beam;
  said powder is sintered using a first electron beam source and fused using at least a second electron beam source; or
  said powder is sintered using a first laser beam source and fused using at least a second laser beam source.

3. The method according to claim 1, further comprising the step of providing said powder hopper movable in a radial direction with respect to said axis of rotation.

4. The method according to claim 2, further comprising the step of keeping a distance between an opening of said powder hopper and an outer surface of said three-dimensional article at constant predetermined value for allowing a predetermined amount of powder to exit from said powder container onto said outer surface of said three-dimensional article.

5. The method according to claim 2, further comprising the step of varying a distance between an opening of said powder hopper and an outer surface of said three-dimensional article for allowing a varying amount of powder to exit from said powder container onto said outer surface of said three-dimensional article.

6. The method according to claim 3, further comprising the steps of measuring the distance between said outer surface of said three-dimensional article and said opening of said powder hopper and using said measured distance for moving said powder hopper to a predetermined position.

7. The method according to claim 3, further comprising the steps of calculating the position of said outer surface of said three-dimensional article and using said calculated position for moving said powder hopper to a predetermined position.

8. The method according to claim 2, further comprising the step of providing said axis of rotation of said build support in a horizontal direction.

9. The method according to claim 1, wherein said energy beam is an electron beam and/or a laser beam.

10. The method according to claim 1, wherein said powder is sintered using at least one electron beam and fused using at least said laser beam.

11. The method according to claim 1, wherein said Powder is sintered using at least one laser beam and fused using at least one electron beam.

12. The method according to claim 1, wherein said powder is sintered using a first electron beam source and fused using at least a second electron beam source.

13. The method according to claim 1, wherein said powder is sintered using a first laser beam source and fused using at least a second laser beam source.

14. The method according to claim 1, further comprising the step of refocusing the electron beam and/or the laser beam as the three dimensional article is expanding in a radial direction.

15. The method according to claim 1, further comprising the step of: moving the electron beam source in a radial direction as the three dimensional article is expanding in said radial direction for keeping the distance between the electron beam source with respect to atop surface of the three-dimensional article at a constant value.

16. The method according to claim 1, further comprising the step of: moving at least one focusing lens element in a radial direction as the three-dimensional article is expanding in said radial direction for keeping the focal point of the beam source at a top surface of the three-dimensional article.

17. The method according to claim 1, further comprising the step of providing at least one heat source for maintaining the heat of the manufactured three-dimensional article.

18. The method according to claim 1, further comprising the steps of: providing at least a first energy beam source at a first position having a variable distance of focus at a first interval from a centre of said axis of rotation, providing at least a second energy beam source at a second position having a variable distance of focus at a second interval from a centre of said axis of rotation, switching from said at least first energy beam source to said at least second energy beam source when said three-dimensional article has expanded a predetermined distance from said centre of said axis of rotation.

19. The method according to claim 1, wherein-said fusing of a predetermined amount of powder is taking place less than one revolution of said rotation after said sintering of the same predetermined amount of powder has taken place.

20. The method according to claim 1, further comprising the step of providing a first and a second powder compressor in between which said powder is provided on said build support, wherein said first and second powder compressor are separated with a distance T defining the thickness of the three-dimensional article.

21. The method according to claim 20, further comprising the step of attaching said at least one of said first or second powder compressor on said powder hopper.

22. The method according to claim 1, further comprising the step of scanning the laser beam and/or the electron beam in a direction parallel to the axis of rotation.

23. The method according to claim 17, further comprising the step of switching the power on or off for said laser beam source or electron beam source.

24. The method according to claim 1, further comprising the step of rotating said build support continuously or stepwise.

25. The method according to claim 1, further comprising the step of providing said at least one powder hopper and said build support inside a vacuum chamber.

26. The method according to claim 1, further comprising the step of arranging said build support movable in a vertical direction.

27. An apparatus for forming a three-dimensional article through successive fusion of parts of applied powder, said apparatus comprising:
  at least one powder hopper comprising powder to be used for forming said three-dimensional article;
  means for providing a predetermined amount of powder on a build support, wherein an axis of rotation of said build support is provided in a horizontal direction;
  means for directing an energy beam over said build support causing at least a portion of said powder to sinter and causing at least a portion of said powder to bond to said build support;
  means for directing an energy beam over said build support causing said powder to fuse in selected locations according to a model to form a first portion of said three-dimensional article; and
  a motor for rotating said build support around said axis of rotation for creating said three-dimensional article, which three-dimensional article is build up layer by layer in a radial direction with respect to said axis of rotation,
  wherein powder is provided continuously throughout the forming of the three-dimensional article, and newly applied powder is sintered continuously in order to attach said powder on said build support or a previously manufactured layer of the three-dimensional article.

28. An apparatus for forming a three-dimensional article through successive fusion of parts of applied powder, said apparatus comprising:
   at least one powder hopper comprising powder to be used for forming said three-dimensional article;
   means for providing a predetermined amount of powder on a build support;
   means for directing an energy beam over said build support causing at least a portion of said powder to sinter and causing at least a portion of said powder to bond to said build support;
   means for directing an energy beam over said build support causing said powder to fuse in selected locations according to a model to form a first portion of said three-dimensional article; and
   a motor for rotating said build support around said axis of rotation for creating said three-dimensional article, which three-dimensional article is build up layer by layer in a radial direction with respect to said axis of rotation,
   wherein at least one of:
      at least an electron beam is used for sintering said powder and at least a laser beam is used for fusing said powder;
      at least a laser beam is used for sintering said powder and at least an electron beam is used for fusing said powder;
      at least a first electron beam source is used for sintering said powder and at least a second electron beam source is used for fusing said powder; or
      at least a first laser beam source is used for sintering said powder and at least a second laser beam source is used for fusing said powder.

29. The apparatus according to claim 27, wherein said apparatus further comprising means for providing said powder hopper movable in a radial direction for keeping a distance between said powder hopper and an outer surface of said three-dimensional article at a constant predetermined value.

30. The apparatus according to claim 28, wherein said axis of rotation is arranged in a horizontal plane.

31. The apparatus according claim 27, wherein at least an electron beam is used for sintering said powder and at least a laser beam is used for fusing said powder.

32. The apparatus according to claim 27, wherein at least a laser beam is used for sintering said powder and at least an electron beam is used for fusing said powder.

33. The apparatus according to claim 27, wherein at least a first electron beam source is used for sintering said powder and at least a second electron beam source is used for fusing said powder.

34. The apparatus according claim 27, wherein at least a first laser beam source is used for sintering said powder and at least a second laser beam source is used for fusing said powder.

35. The apparatus according to claim 27, wherein at least one heat source is provided for maintaining the heat of the manufactured three-dimensional article.

36. The apparatus according to claim 35, wherein said heat source is an IR heater.

37. The apparatus according to claim 27, wherein a first energy beam source is provided at a first position having a variable distance of focus at a first interval from a centre of said axis of rotation, at least a second energy beam source is provided at a second position having a variable distance of focus at least a second interval from a centre of said axis of rotation, a switch for switching from said first energy beam source to said at least second energy beam source when said three-dimensional article has expanded a predetermined distance from said centre of said axis of rotation.

38. The apparatus according to claim 27, wherein a first and a second powder compressor are arranged on said powder hopper essentially in parallel with a radial direction to said radial direction of said axis of rotation, where said powder is provided in between said first and second powder compressor.

39. The apparatus according to claim 27, further comprising means for refocusing the electron beam and/or the laser beam as the three dimensional article is expanding.

40. The apparatus according to claim 27, wherein the electron beam source is movable in a radial direction for keeping a distance between the electron beam source with respect to a top surface of the three dimensional article at a constant value.

41. The apparatus according to claim 27, wherein at least one focusing lens element is arranged movable in a radial direction for keeping a focal point of said laser beam source at a top surface of the three dimensional article.

42. The apparatus according to claim 27, wherein said build support is arranged movable in a vertical direction.

* * * * *